(12) United States Patent
Agarwal et al.

(10) Patent No.: US 10,273,587 B2
(45) Date of Patent: Apr. 30, 2019

(54) ELECTROCHEMICAL ELECTRODE COMPRISING TIN-BASED CATALYST, METHOD OF MAKING, AND METHOD OF USE

(71) Applicant: DNV GL AS, Oslo (NO)

(72) Inventors: Arun S. Agarwal, Dublin, OH (US); Edward James Rode, Dublin, OH (US); Dushyant Gautam, Dublin, OH (US)

(73) Assignee: DNV GL AS, Oslo (NO)

( * ) Notice: Subject to any disclaimer, the term of this patent is extended or adjusted under 35 U.S.C. 154(b) by 328 days.

(21) Appl. No.: 14/986,654

(22) Filed: Jan. 2, 2016

(65) Prior Publication Data

US 2017/0191174 A1    Jul. 6, 2017

(51) Int. Cl.
| | | |
|---|---|---|
| *C25B 3/04* | (2006.01) | |
| *C25B 9/08* | (2006.01) | |
| *C25B 15/08* | (2006.01) | |
| *C25B 11/04* | (2006.01) | |
| *H01M 4/38* | (2006.01) | |
| *H01M 4/90* | (2006.01) | |
| *B01J 23/14* | (2006.01) | |
| *B01J 21/18* | (2006.01) | |
| *B01J 37/00* | (2006.01) | |

(52) U.S. Cl.
CPC .................. *C25B 3/04* (2013.01); *B01J 21/18* (2013.01); *B01J 23/14* (2013.01); *B01J 37/00* (2013.01); *C25B 9/08* (2013.01); *C25B 11/0489* (2013.01); *C25B 15/08* (2013.01); *H01M 4/387* (2013.01); *H01M 4/9083* (2013.01)

(58) Field of Classification Search
CPC    B01J 21/18; B01J 23/14; B01J 37/00; H01M 4/387; H01M 4/9083
USPC .......................... 502/101, 182, 349; 429/528
See application file for complete search history.

(56) References Cited

U.S. PATENT DOCUMENTS 6,074,692 A  *  6/2000  Hulett ................. H01M 8/1004
                                                       427/115
7,867,940 B2 *  1/2011  Pak .......................... B01J 23/42
                                                       502/101

(Continued)

FOREIGN PATENT DOCUMENTS

JP           57005266 A  *  1/1982   .............. H01M 4/88

OTHER PUBLICATIONS

Cho, et al., Oxidation Study of Pure Tin and Its Alloys via Electrochemical Reduction Analysis, J. Elec. Mater, v.34, No. 5, (2005) 635-642.

(Continued)

*Primary Examiner* — Patricia L. Hailey
(74) *Attorney, Agent, or Firm* — The Richards Law Firm LLC; William B. Richards, Esq.

(57) ABSTRACT

An electrochemical electrode comprising a tin-based catalyst, method of making, and method of use are provided. Catalyst particles are prepared which comprise tin deposits of about 0.1 nm to 10 nm deposited onto carbon support. Preparing an ink comprising the catalyst particles and a binder enable an electrode to be prepared comprising the catalyst particles bound to an electrode substrate. The electrode may then be used in an apparatus and process to reduce carbon dioxide to products such as formate and formic acid at Faradaic Efficiencies up to 95 percent.

19 Claims, 28 Drawing Sheets

(56) References Cited

U.S. PATENT DOCUMENTS

| | | | | |
|---|---|---|---|---|
| 8,912,114 | B2* | 12/2014 | Mukerjee | H01M 4/921 502/182 |
| 2004/0197638 | A1* | 10/2004 | McElrath | B01J 21/185 429/454 |
| 2005/0079402 | A1* | 4/2005 | Tanaka | H01M 4/8652 429/412 |
| 2015/0214554 | A1* | 7/2015 | Kaneda | H01M 4/9041 429/484 |

OTHER PUBLICATIONS

Jiang, et al., Catalytic Properties of Silver Nanoparticles Supported on Silica Spheres, J. Phys. Chem. B, 109, (2005) 1730-1735.

Chen et al., Tin Oxide Dependence of the CO2 Reduction Efficiency on Tin Electrodes and Enhanced Activity for Tin/Tin Oxide Thin-Film Catalysts, JACS, 134 (2012) 1986-1989.

Manjula, et al, A Facile and Green Approach for the Controlled Synthesis of Porous SnO2 Nanospheres: Application as an Efficient Photocatalyst and an Excellent Gas Sensing Material, ACS App. Mater. Inter.4 (2012), 6252-6260.

Zhang, et al., Nanostructured Tin Catalysts for Selective Electrochemical Reduction of Carbon Dioxide to Formate, JACS, 136 (2014) 1734-1737.

Zhang, et al., Nanostructured Tin Catalysts for Selective Electrochemical Reduction of Carbon Dioxide to Formate, JACS, 136 (2014) 1734-1737. Supporting Information.

Centi, et al.; Electrocatalytic conversion of CO2 to long carbon-chain hydrocarbons; The Royal Society of Chemistry; Apr. 12, 2007; 671-78.

Perathoner, et al.; Nanostructured Electrocatalytic PT-Carbon Materials for Fuel Cells and CO2 Conversion; Kinetics and Catalysis; 2007; 877-883; vol. 48 No. 6.

* cited by examiner

ELECTROCHEMICAL ELECTRODE COMPRISING TIN-BASED CATALYST, METHOD OF MAKING, AND METHOD OF USE

FIELD

This description relates generally to electrodes for electrochemical reactions, particularly to cathodic electrodes comprising tin-based catalyst, and more particularly to such electrodes for the electrochemical reduction of carbon dioxide to formate and formic acid. Also included are methods of making and using such electrodes.

BACKGROUND

Electrochemical reactions involve the use of an electric current to effect chemical reactions. In a typical arrangement, an anode immersed in an anolyte and a cathode immersed in a catholyte are separated by a membrane, generally an ion exchange membrane. An oxidation reaction takes place at the anode and a reduction reaction takes place at the cathode. For example, with the electrochemical reduction of carbon dioxide, carbon dioxide is reduced to formate and formic acid at the cathode and oxygen is evolved from water at the anode. In some applications, carbon dioxide is introduced into a catholyte compartment through a porous cathode which porous cathode comprises a cathodic catalyst adapted to reduce carbon dioxide to formate and formic acid.

Cathodic and anodic catalysts play important roles in determining what reactions occur at the cathode and at the anode, respectively, as well as the electrolytic efficiency of such reactions. Efficiency is typically measured as Faradaic Efficiency (FE) and is the efficiency with which electrons (charge) are transferred. That is, the percent of the total current that passes through the electrochemical cell that is used to produce the desired product (e.g., formate). In addition, it is desirable to achieve high current density in stable, long-term use. Tin-based cathodic catalysts, which generally exist as tin, tin oxide (II) (SnO), and tin oxide (IV) ($SnO_2$) (collectively, $SnO_x$), have been shown to give good results in the selective electrochemical reduction of carbon dioxide to formate and formic acid. In addition to selectivity to formate and formic acid, desirable characteristics of such tin-based cathodic catalysts include high surface area of the catalyst on the cathode, physical and mechanical stability, high FE, and high and stable current density during operation. Finally, while catalyst activity can be unpredictable and is highly dependent upon structure, morphology, and electrolysis conditions, other post-transition metals such as lead and indium may also be candidates.

BRIEF SUMMARY OF THE INVENTION

Electrochemical electrodes comprising tin-based catalysts, method of making, and method of use are disclosed. Particularly, the electrodes comprise tin-based nano-scale deposits on carbon support to produce Sn—C particles and such Sn—C particles are applied to a support substrate using a binder. In use, the resulting electrodes provide stable high current density and high FE or selectivity over time.

The catalysts are prepared by depositing tin onto a carbon support such as carbon black [e.g., Vulcan® XC72 (Cabot Corp., Boston, Mass.)] using a solution of tin (II) chloride ($SnCl_2$), ethylene glycol, carbon black, and water. After recovery, the resultant Sn—C catalyst particles are combined with a binder such as a sulfonated tetrafluoroethylene-based fluoropolymer-copolymer (e.g., Nafion®, The Chemours Co., Wilmington, Del.) or compounds comprising tetrafluoroethylene groups [e.g., polytetrafluoroethylene (PTFE)] and applied to a support substrate such as carbon fiber paper (e.g., TORAY® Carbon Paper 120, Toray Industries, Inc., Tokyo Japan). The finished electrodes are used in an electrolytic process to reduce carbon dioxide to formate and formic acid.

In one exemplary embodiment, an apparatus is provided for the electrochemical reduction of carbon dioxide to formate. The apparatus includes an anolyte compartment, the anolyte compartment at least partially defined by an anode and a membrane, a catholyte compartment, the catholyte compartment at least partially defined by the membrane and a cathode, and a gas compartment, the gas compartment in fluid communication with the cathode. The cathode comprises a porous substrate and a catalytic coating at least partially covering the substrate. The catalytic coating is applied to the substrate using a process comprising the steps of (a) mixing catalyst powder, the catalyst powder comprising tin-carbon particles, the tin-carbon particles comprising 0.1 nm to 10 nm tin deposits on carbon support, an alcohol-based solvent, and polymeric binder, to form a catalyst ink, (b) applying the ink to the substrate, and (c) drying the ink to the substrate.

In a further exemplary embodiment, the tin deposits comprise greater than 22 weight percent of the catalyst powder.

In a further exemplary embodiment, the substrate is carbon fiber paper, the catalyst loading is between 0.1 $mg/cm^2$ and 10 $mg/cm^2$, and the binder content is between 0.1 to 5 weight percent of the catalyst loading.

In a further exemplary embodiment, utilizing the apparatus for the electrochemical reduction of carbon dioxide to formate, a process comprises the steps of feeding an appropriate anolyte into the anolyte compartment, (b) feeding an appropriate catholyte into the catholyte compartment, (c) feeding carbon dioxide into the gas compartment, through the cathode, and into the cathode compartment, and (d) impressing a voltage between the anode and the cathode. In a further exemplary embodiment, the impressed voltage is sufficient to provide a $V_{CATHODE}$ range between −1.5 and −2.0 $V_{SCE}$. In a further exemplary embodiment, the Faradaic Efficiency of carbon dioxide to formate is about 55 to 95 percent over a period of over 100 hours.

In another exemplary embodiment, a process is provided comprising the steps of (a) preparing catalyst powder by (i) mixing, proportionally, 0.84 gm tin chloride (II), 200 ml ethylene glycol, 2 ml deionized water, and 0.20 gm carbon support, (ii) refluxing the mixture of Step (a)(i) at between 170 deg. C. and 200 deg. C. for about three hours, (iii) cooling the refluxed material, and (iv) filtering and drying the cooled, refluxed material to obtain the catalyst powder, (b) preparing a catalyst ink by mixing, proportionally, 0.02 gm catalyst powder, 100 ml isopropyl alcohol, and between 0.02 mg and 1 mg sulfonated tetrafluoroethylene-based fluoropolymer-copolymer binder, (c) spraying a portion of catalyst ink uniformly onto a porous substrate, (d) allowing the catalyst ink sprayed onto the porous substrate to dry, and (e) repeating Steps (c) and (d) until a desired coating weight is achieved.

In a further exemplary embodiment, an apparatus is provided comprising an anolyte compartment, which anolyte compartment is at least partially defined by an anode and a membrane, a catholyte compartment, which catholyte compartment is at least partially defined by the membrane and a cathode, and a gas compartment, the gas compartment in fluid communication with the cathode. The cathode is prepared by a process comprising the steps of (a) preparing catalyst powder by (i) mixing, proportionally, 0.84 gm tin chloride (II), 200 ml ethylene glycol, 2 ml deionized water, and 0.20 gm carbon support, (ii) refluxing the mixture of Step (a)(i) at between 170 deg. C. and 200 deg. C. for about three hours, (iii) cooling the refluxed material, and (iv) filtering and drying the cooled, refluxed material to obtain the catalyst powder, (b) preparing a catalyst ink by mixing, proportionally, 0.02 gm catalyst powder, 100 ml isopropyl alcohol, and between 0.02 mg and 1 mg sulfonated tetrafluoroethylene-based fluoropolymer-copolymer binder, (c) spraying a portion of catalyst ink uniformly onto a porous substrate, (d) allowing the catalyst ink sprayed onto the porous substrate to dry, and (e) repeating Steps (c) and (d) until a desired coating weight is achieved.

In another exemplary embodiment, a process is provided comprising the steps of (a) preparing a catalyst powder by (i) mixing, proportionally, tin chloride (II) and carbon support in a ratio of about 4.5 gm/gm and sufficient ethylene glycol and water to maintain a dilute slurry, (ii) refluxing the mixture of Step (a)(i) at between 170 deg. C. and 200 deg. C. for about three hours, (iii) cooling the refluxed material, and (iv) filtering and drying the cooled, refluxed material to obtain the catalyst powder (b) preparing a catalyst ink by mixing, proportionally, catalyst powder and isopropyl alcohol in a ratio of about 0.02 gm/100 ml with a suitable binder, which binder is proportional to the isopropyl alcohol in a ratio of about 0.02 mg to 1 mg per 100 ml isopropyl alcohol, for about 30 minutes, (c) spraying a portion of the catalyst ink uniformly onto a porous substrate, (d) allowing the catalyst ink sprayed onto the porous substrate to dry; and (e) repeating Steps (c) and (d) until a desired coating weight is achieved.

In another exemplary embodiment, an apparatus is provided which apparatus includes an anolyte compartment, the anolyte compartment at least partially defined by an anode and a membrane, a catholyte compartment, the catholyte compartment at least partially defined by the membrane and a cathode, and a gas compartment, the gas compartment in fluid communication with the cathode. The cathode is prepared by a process comprising the steps of (a) preparing a catalyst powder by (i) mixing, proportionally, tin chloride (II) and carbon support in a ratio of about 4.5 gm/gm and sufficient ethylene glycol and water to maintain a dilute slurry, (ii) refluxing the mixture of Step (a)(i) at between 170 deg. C. and 200 deg. C. for about three hours, (iii) cooling the refluxed material, and (iv) filtering and drying the cooled, refluxed material to obtain the catalyst powder (b) preparing a catalyst ink by mixing, proportionally, catalyst powder and isopropyl alcohol in a ratio of about 0.02 gm/100 ml with a suitable binder, which binder is proportional to the isopropyl alcohol in a ratio of about 0.02 mg to 1 mg per 100 ml isopropyl alcohol, for about 30 minutes, (c) spraying a portion of the catalyst ink uniformly onto a porous substrate, (d) allowing the catalyst ink sprayed onto the porous substrate to dry; and (e) repeating Steps (c) and (d) until a desired coating weight is achieved.

In a further exemplary embodiment, utilizing the apparatus described just above, a process comprises (a) feeding an appropriate anolyte into the anolyte compartment, (b) feeding an appropriate catholyte into the catholyte compartment, (c) feeding carbon dioxide into the gas compartment, through the cathode, and into the cathode compartment, and (d) impressing a voltage between the anode and the cathode. In a further exemplary embodiment, the impressed voltage is sufficient to provide a $V_{CATHODE}$ range between −1.5 and −2.0 $V_{SCE}$. In a further exemplar embodiment, the Faradic Efficiency of carbon dioxide to formate is about 55 to 95 over a period of over 100 hours.

BRIEF DESCRIPTION OF THE SEVERAL FIGURES

The invention will be more readily understood by reference to the accompanying figures. The figures are incorporated in, and constitute a part of, this specification, illustrate several embodiments consistent with the invention and, together with the description, serve to explain the principles of the invention. For purposes of illustration, drawings may not be to scale.

Figure 1:
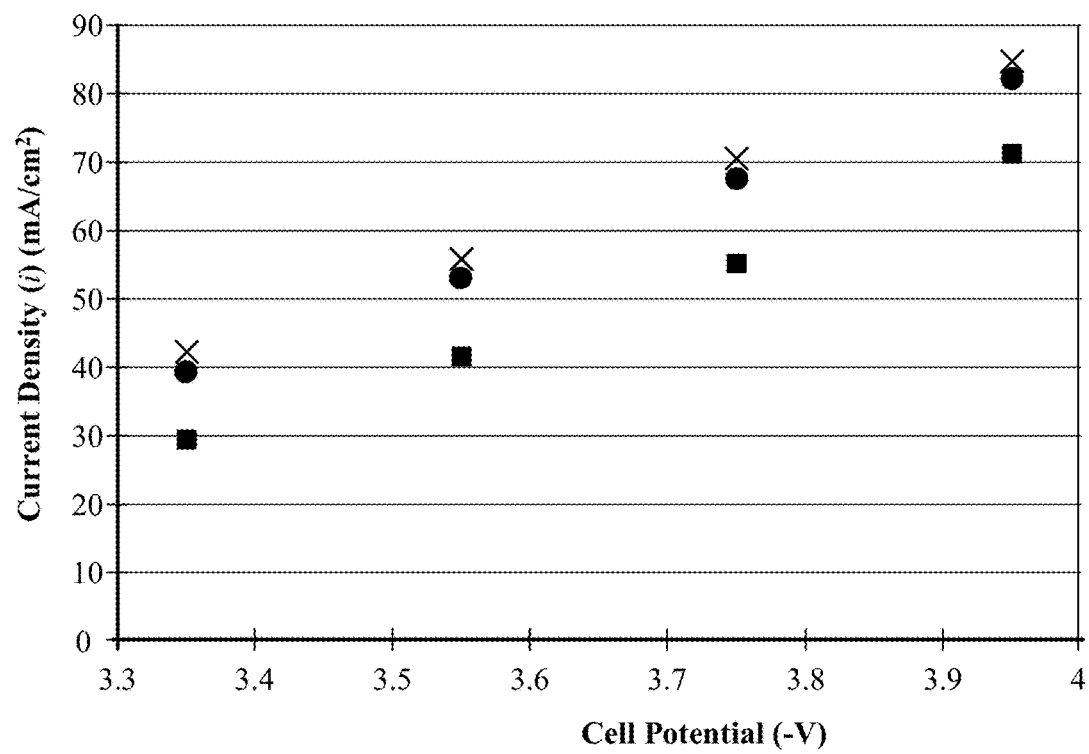
FIG. 1 is a graphical representation of Current Density i (mA/cm$^2$) v. Cell Potential (−V) for Sn—C-1 particles.
Figure 1:
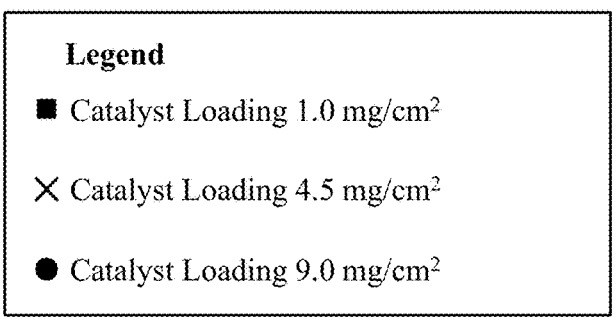

In describing the various embodiments of the invention, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Preparation of Sn—C Catalyst Particles

Catalyst particles of nano-sized tin deposited on carbon powders (Sn—C) were prepared using the procedure shown in Table 1 below.

TABLE 1

(1) mix predetermined amounts of deionized water and ethylene glycol;
(2) add predetermined amounts of tin chloride (II) and ethylene glycol and ultrasonicate (e.g., ten minutes);

TABLE 1-continued (3) add a predetermined amount of carbon black and ultrasonicate (e.g., 30 minutes);
(4) reflux the mixture at a predetermined temperature (e.g., 196 deg. C.) for a predetermined time (e.g., three hours) while stirring;
(5) allow the mixture to cool to room temperature;
(6) vacuum filter the solution through a 0.2 micron (μm) membrane;
(7) immerse the membrane with the cake into 50 ml isopropyl alcohol (IPA) and ultrasonicate (e.g., ten minutes) until all black powder is removed;
(8) heat black powder/IPA mixture to evaporate the IPA;
(9) scrape out resulting black powder;
10) calculate final weight percent $SnO_X$
{[(final weight Sn-C catalyst powder) − (initial weight carbon black powder)]/final weight Sn-C catalyst powder} * 100

The carbon black used was Vulcan® XC72 (Cabot Corp., Boston, Mass.) having a nominal particle size of 1 micron. Typical surface area is about 250 $m^2$/gram. Other suitable carbon-based support materials include carbon nanowires and carbon nanotubes.

Sn—C Experiment 1 (Sn—C-1)

Using the procedure shown in Table 1, Sn—C particles were prepared using the ingredients and recipe shown in Table 2 below.

TABLE 2

| Compound | Amount |
| --- | --- |
| Tin Chloride (II) | 5.00 gm |
| Ethylene Glycol | 400 ml |
| Deionized Water | 15 ml |
| Carbon Black | 2.00 gm |

The mixture was refluxed at 170 deg. C. for four hours, cooled, and filtered to obtain the Sn—C particles (Sn—C-1). Electrodes were prepared using a modification of the electrode preparation protocol outlined herein below in Table 6. The significant difference in the modified electrode preparation protocol was that no binder was used to adhere the Sn—C-1 particles to the electrode substrate [i.e., carbon fiber paper (CFP)]. This allowed measurement of the performance of the catalyst particles themselves in terms of FE (%) as a function of applied cathode voltage without the possible complex effects due to the presence of a binder. While not wishing to be bound by any particular theory, it is believed that without a binder to adhere the Sn—C-1 particles to the CFP substrate, the current density [i (mA/$cm^2$)] may decrease continuously with Sn—C-1 particles being washed away in the cell. For whatever current is noted, however, the FE (%) can be calculated. Thus, the FE (%) so obtained may be compared with that observed where solid Sn or tin-electroplated CFP electrodes are tested (i.e., 70-90% FE).

Figure 2:
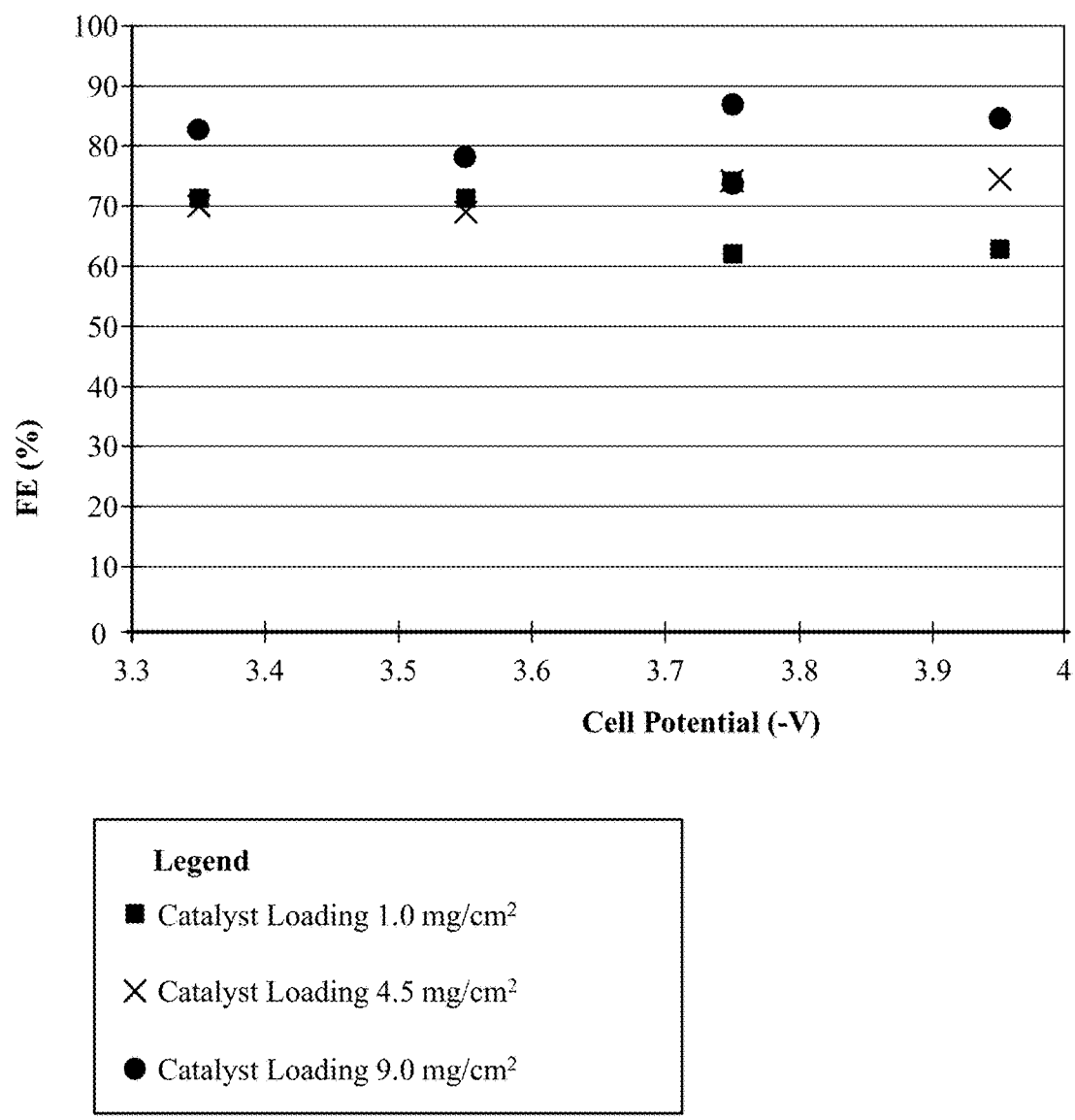
FIG. 2 is a graphical representation of FE v. Cell Potential (−V) for Sn—C-1 particles.

As shown in FIG. 1, at total cell voltages between 3.35 and 3.95 (−V), the resulting catalyst exhibited low current densities. While not wishing to be bound by any particular theory, it is believed that in the absence of a binder to hold the particles to the CFP substrate, the particles did not adhere well. However, as shown in FIG. 2, at the chosen cell voltage range, FE is well-maintained.

Sn—C Experiment 2 (Sn—C-2)

Using the procedure shown in Table 1, Sn—C particles were prepared using the ingredients and recipe shown in Table 3 below.

TABLE 3

| Compound | Amount |
| --- | --- |
| Tin Chloride (II) | 0.84 gm |
| Ethylene Glycol | 200 ml |
| Deionized Water | 2 ml[1] |
| Carbon Black | 0.60 gm |

[1]1% of ethylene glycol volume

The mixture was refluxed at 196 deg. C. for three hours, cooled, and filtered to obtain the Sn—C-2 particles (Sn—C-2). Transmission electron microscopy (TEM) images for the resulting Sn—C-2 particles are shown in FIGS. 4-9. Tin-based crystallites of about 5 nm are distributed on the carbon support. The percent tin-based material, comprising $SnO_X$, was about 22 weight percent.

Sn—C Experiment 3 (Sn—C-3)

Using the procedure shown in Table 1, Sn—C particles were prepared using the ingredients recipe shown in Table 4 below.

TABLE 4

| Compound | Amount |
| --- | --- |
| Tin Chloride (II) | 0.84 gm |
| Ethylene Glycol | 200 ml |
| Deionized Water | 2 ml |
| Carbon Black | 0.20 gm |

Figure 10:
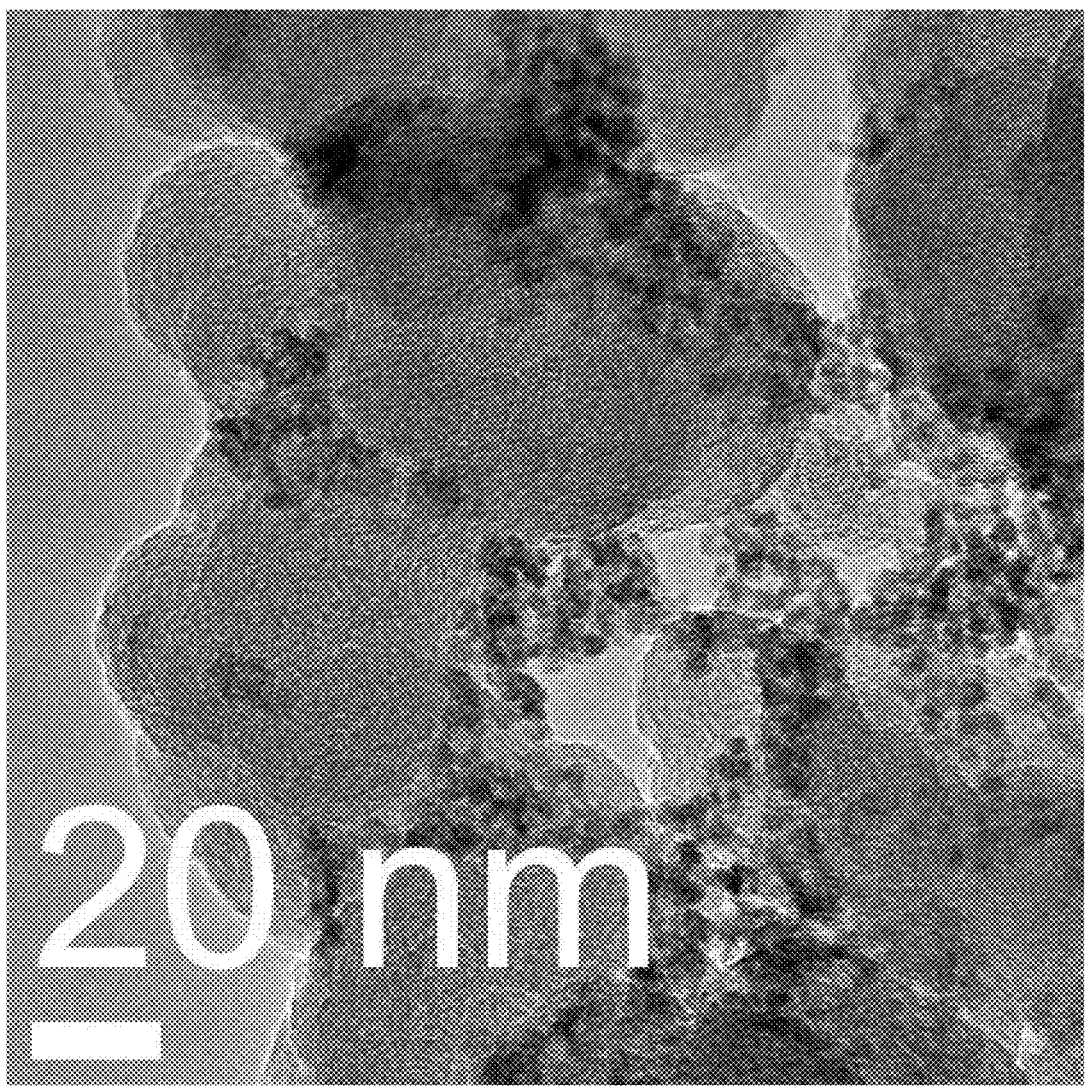
FIGS. 10 and 11 are TEM images of Sn—C-3 particles from Sn—C Experiment 3.
Figure 11:
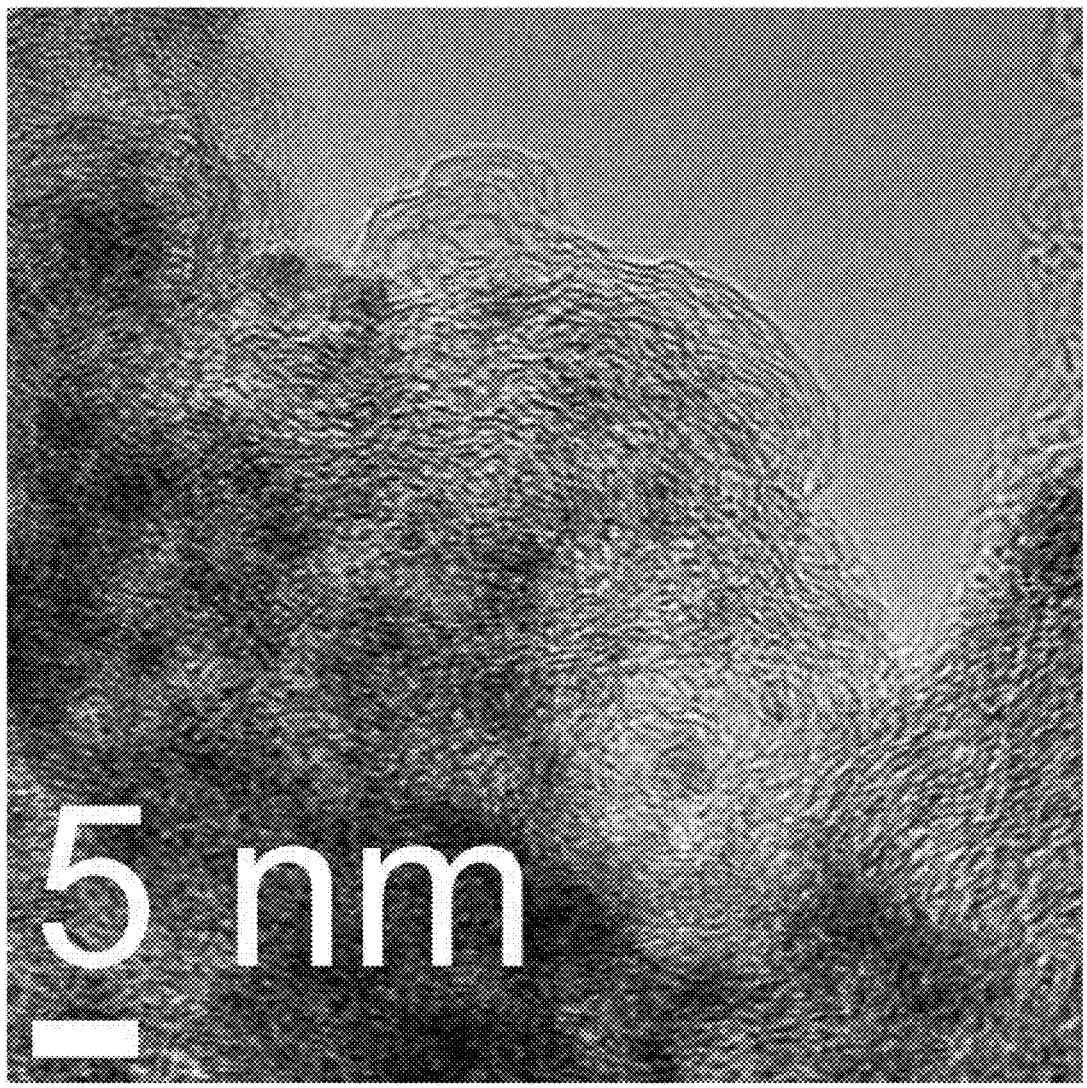

The mixture was refluxed at 196 deg. C. for three hours, cooled, and filtered to obtain Sn—C particles (Sn—C-3). Using less carbon, by proportion, than Sn—C Experiment 2 (Sn—C-2), the percent tin-based material was about 30 weight percent. TEM images for the resulting Sn—C-3 particles are shown in FIGS. 10-11. Tin-based crystallites of about 5 nm are distributed on the carbon support.

Sn—C Experiment 4 (Sn—C-4)

Using the procedure shown in Table 1 and the recipe shown in Table 4, an effort was made to increase the size of the tin-based nano deposits on the carbon support to the range of 10 nm. Such size variation is dependent upon such factors as the time of hydrothermal processing, the water: ethylene glycol ratio, and the concentration of tin chloride. The procedure was the same as that for Experiment 3, except that the time of hydrothermal processing was six hours, instead of three. The results, shown below in Table 5, were disappointing, however, as the resulting catalytic electrodes exhibited very low FE (i.e., 33 to 60 percent).

TABLE 5

| Time (hrs) | Cell Potential (−V) | Current Density [i (mA/$cm^2$)] | Formate Current Density [i (mA/$cm^2$)] | FE (%) |
| --- | --- | --- | --- | --- |
| 0 | 3.75 | 106.0 | 33.4 | 31.6 |
| 1 | 3.75 | 100.5 | 59.5 | 59.2 |
| 3 | 3.75 | 98.5 | 51.6 | 52.4 |
| 24.5 | 3.75 | 92.0 | 40.2 | 43.7 |

Electrode Preparation

Electrodes were prepared based upon Sn—C-3 particles prepared according to Sn—C Experiment 3 above. A porous and electrically conductive electrode substrate was used which comprised carbon fiber paper (CFP). The CFP used in these experiments was TORAY® Carbon Paper 120 which had a thickness of about 350 microns and a porosity of about 80 percent. The CFP microstructure consists of carbon fibers about 7-10 microns in diameter and are held together with polytetrafluoroethylene (PTFE) binder. A catalyst ink comprising Sn—C-3 particles was prepared using a sulfonated tetrafluoroethylene-based fluoropolymer-copolymer (e.g., Nafion®). As supplied, the Nafion® binder was a 5 percent w/w solution in aliphatic alcohols, principally isopropyl, and water, from Sigma Aldrich. This solution was further diluted with water to form a solution with a binder concentration of about 2 mg/ml. Requisite amounts of this diluted solution was used to produce electrodes with a binder concentration between 0.03 percent w/w and 5 percent w/w of catalyst loading. The electrodes were prepared according to the procedure shown in Table 6 below.

TABLE 6

(1) prepare a catalyst ink mix by ultrasonicating predetermined amounts of catalyst powder (e.g., 0.02 gm) prepared as above, isopropyl alcohol (e.g., 100 ml), and a requisite amount of a solution containing sulfonated tetrafluoroethylene-based fluoropolymer-copolymer binder (e.g., Nafion ®) to provide the desired binder loading for a period of time (e.g., 30 minutes);
(2) prepare an electrode substrate from a section of carbon fiber paper (CFP);
(3) spray catalyst ink uniformly onto the CFP until just wet and immediately place sprayed electrode onto hot plate until dry (e.g., few seconds)[1];
(4) repeat (3) until desired coating weight is achieved;
(5) calculate coating weight per unit area:
(coating weight)/(geometric area of electrode)

[1]Attempts to apply large amounts of ink in one coating may result in Sn—C particle "clumps" which inhibit catalytic effectiveness.

Best results are obtained if thick coatings as well as low catalysts loadings are avoided. Thicker coatings may crack and fall away from the substrate surface, particularly due to physical abrasion caused by flow-through carbon dioxide. Low loading, on the other hand, may not be sufficient to cover the entire substrate surface which a resulting loss of efficiency. Experimental catalyst loadings ranged from 0.45-4.5 mg/cm$^2$ with varying binder concentrations of 0.03-5 weight percent. Catalyst loadings are calculated as shown in Table 6. While not wishing to be bound by any particular theory, it is believed that excess binder produces an undesirable overload of the binder onto the Sn—C particles which effectively blocks the surface area of the Sn—C particles available for catalyst activity. Too little binder may reduce the ability of the Sn—C particles to adhere to the CFP substrate surface.

To study the operational effects of the various electrodes as cathodes, it was necessary to obtain measurements of the cathode voltage. Since the cathode voltage cannot be directly applied, continuous, single-pass experiments were conducted where applied cell voltage was monitored and controlled such that the resulting cathode voltage was kept as close a possible to a predetermined value using the following formula:

$$V_{APPLIED\text{-}TOTAL\text{-}CELL} = V_{CATHODE} + IR + V_{ANODE}, \quad (1)$$

where $V_{ANODE}$=anode voltage at the prevailing current density, i (mA/cm$^2$) and IR=cell internal resistance or ohmic potential drop in the solution at the prevailing current density, i (mA/cm$^2$). Experiments were performed to determine IR and $V_{ANODE}$ so that $V_{CATHODE}$ could be calculated from Eq. (1).

Figure 3:
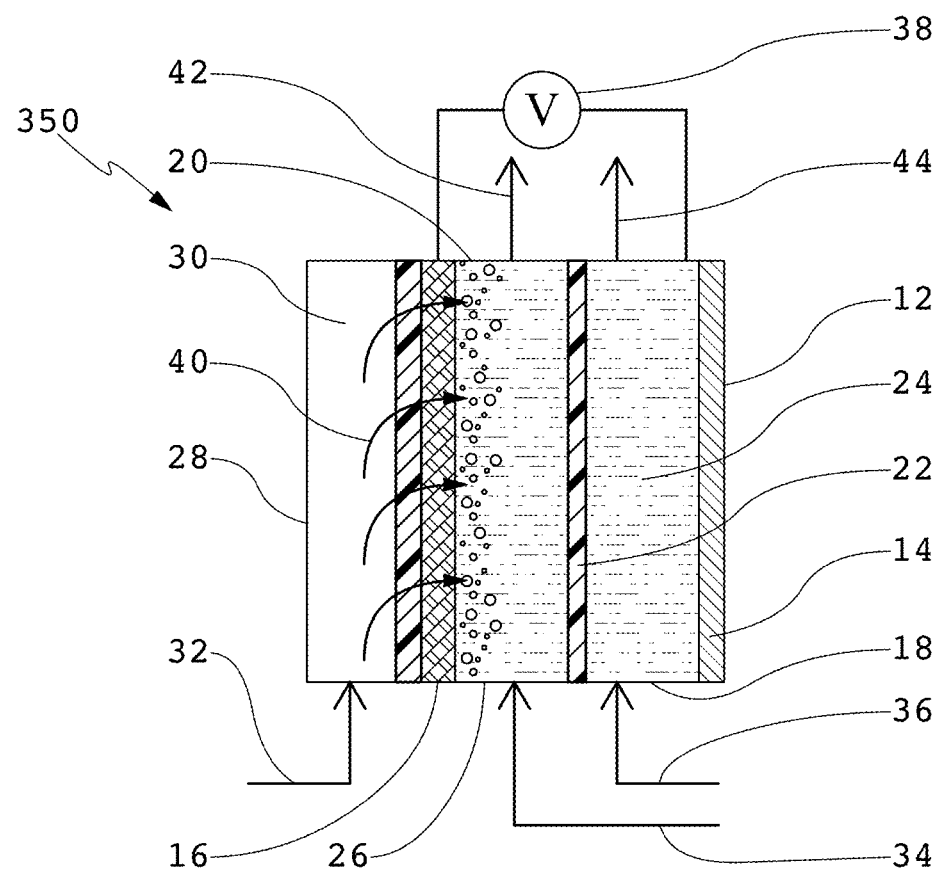
FIG. 3 is a schematic diagram of an experimental test apparatus.
Figure 4:
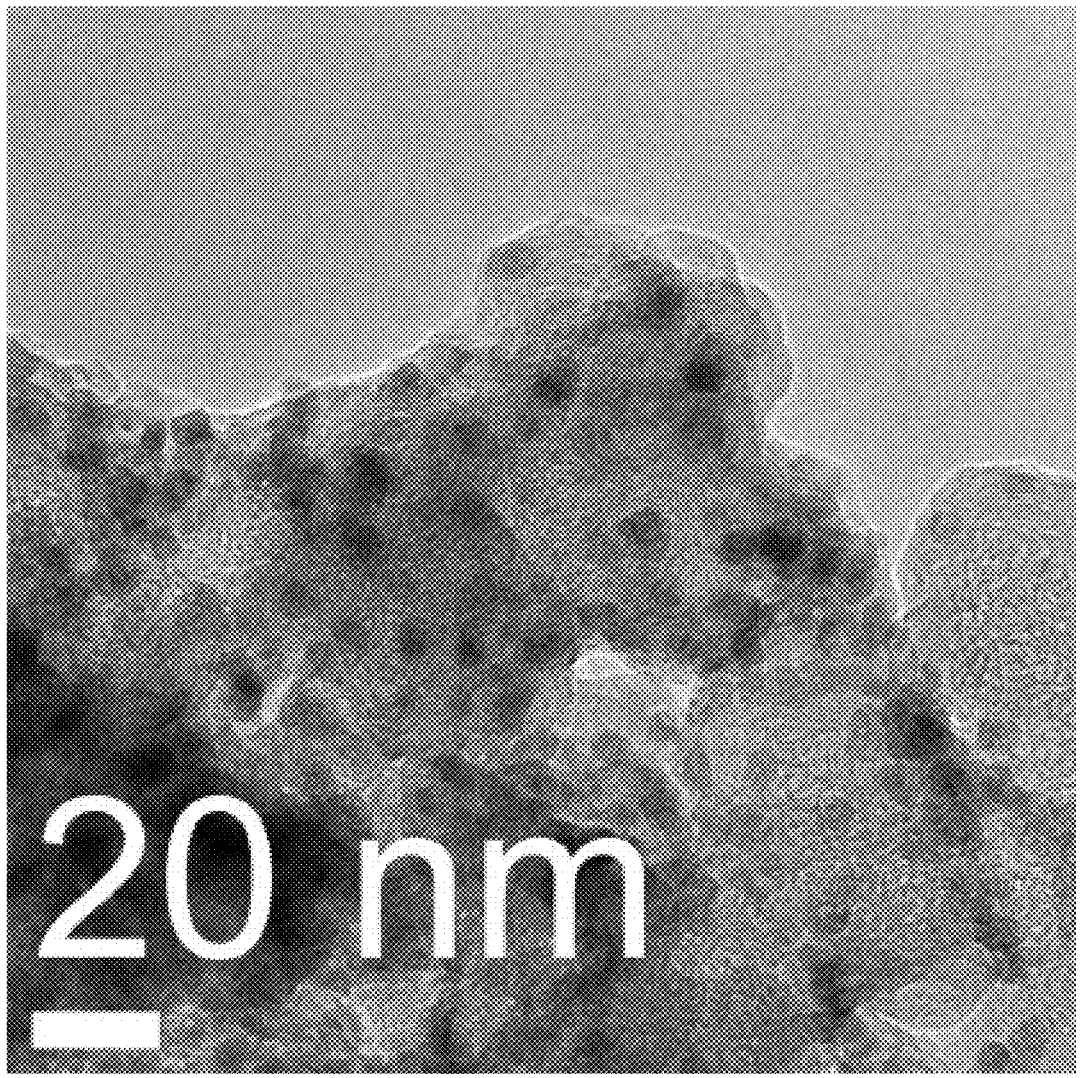
FIGS. 4-9 are transmission electron microscopy (TEM) images of Sn—C-2 particles from Sn—C Experiment 2.
Figure 5:
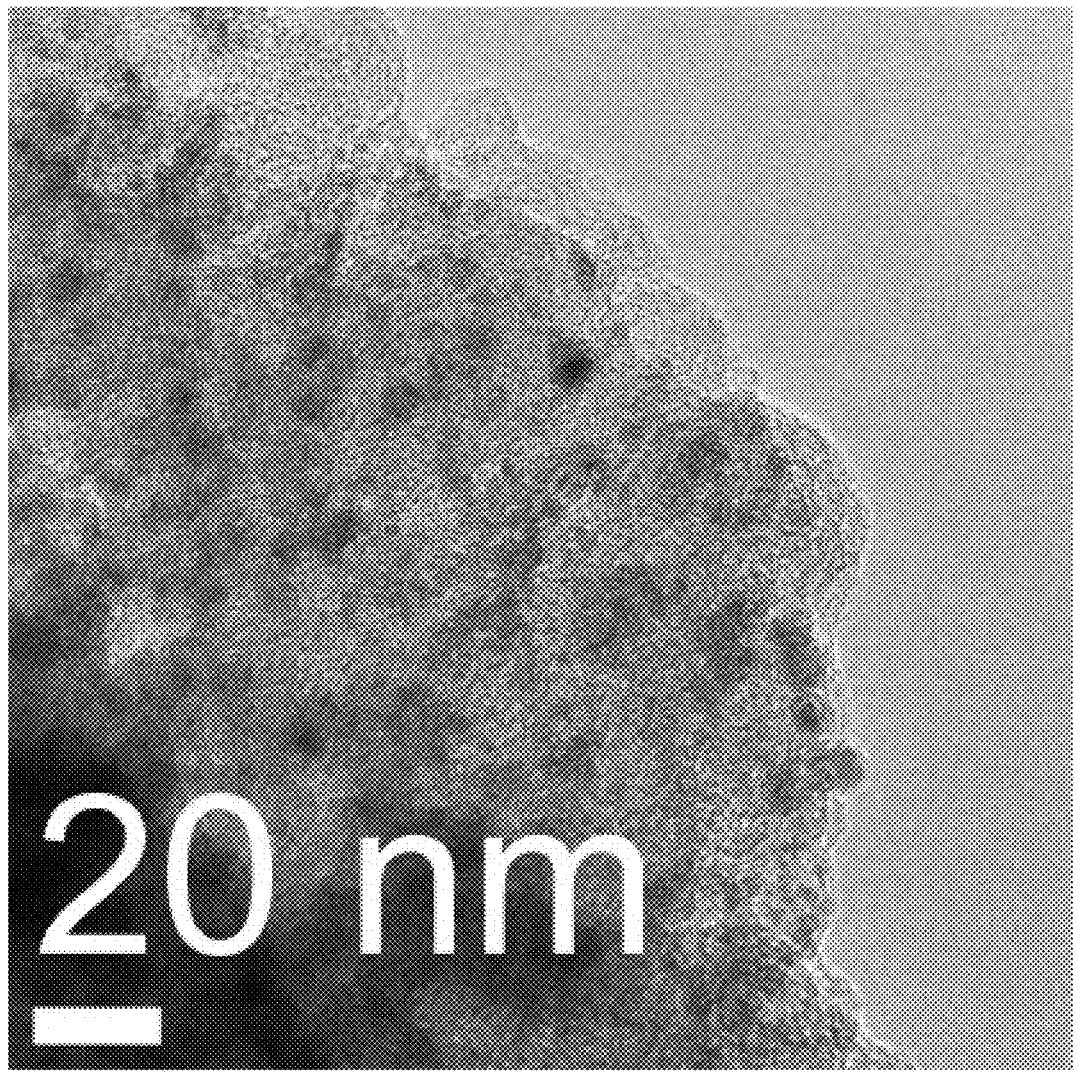
Figure 6:
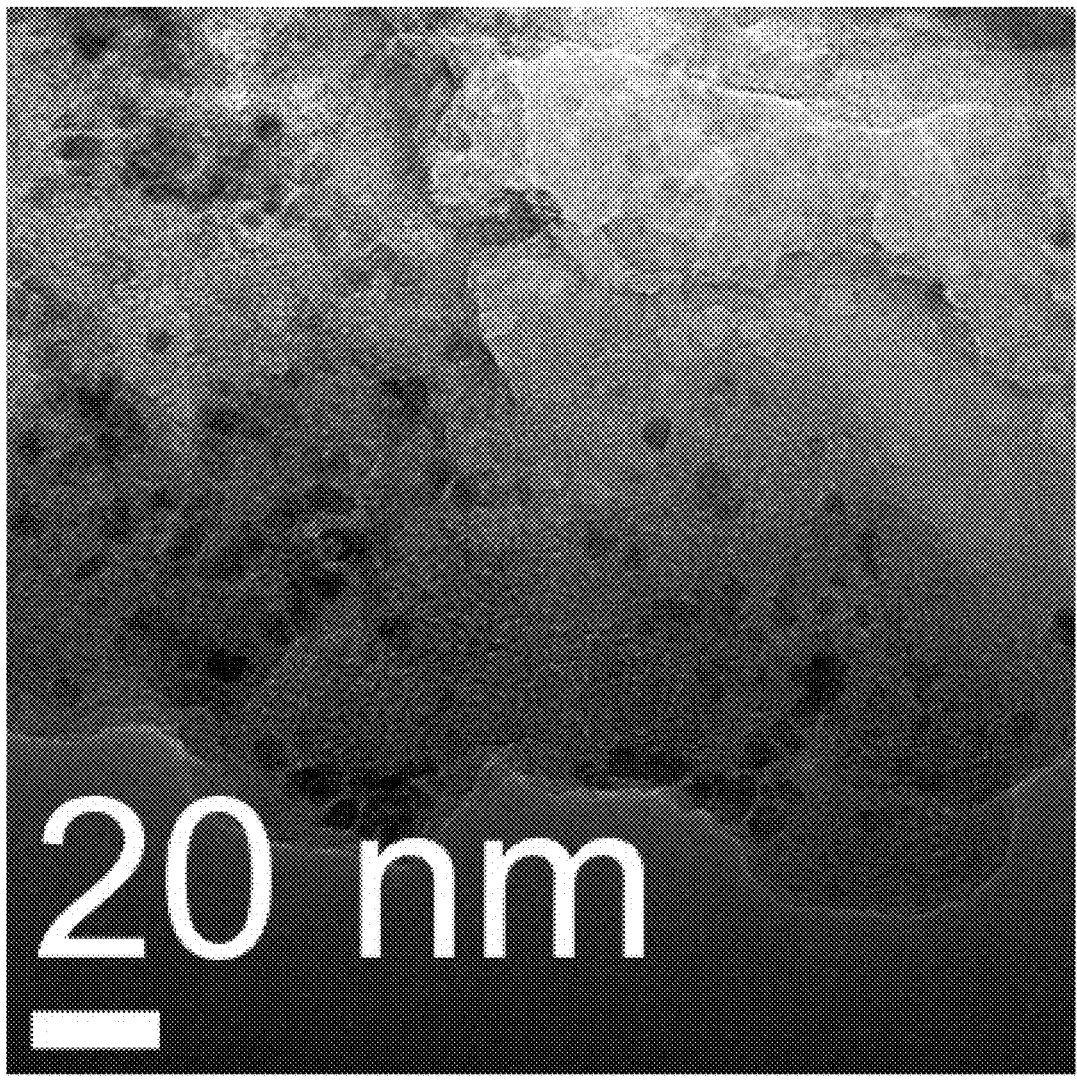
Figure 7:
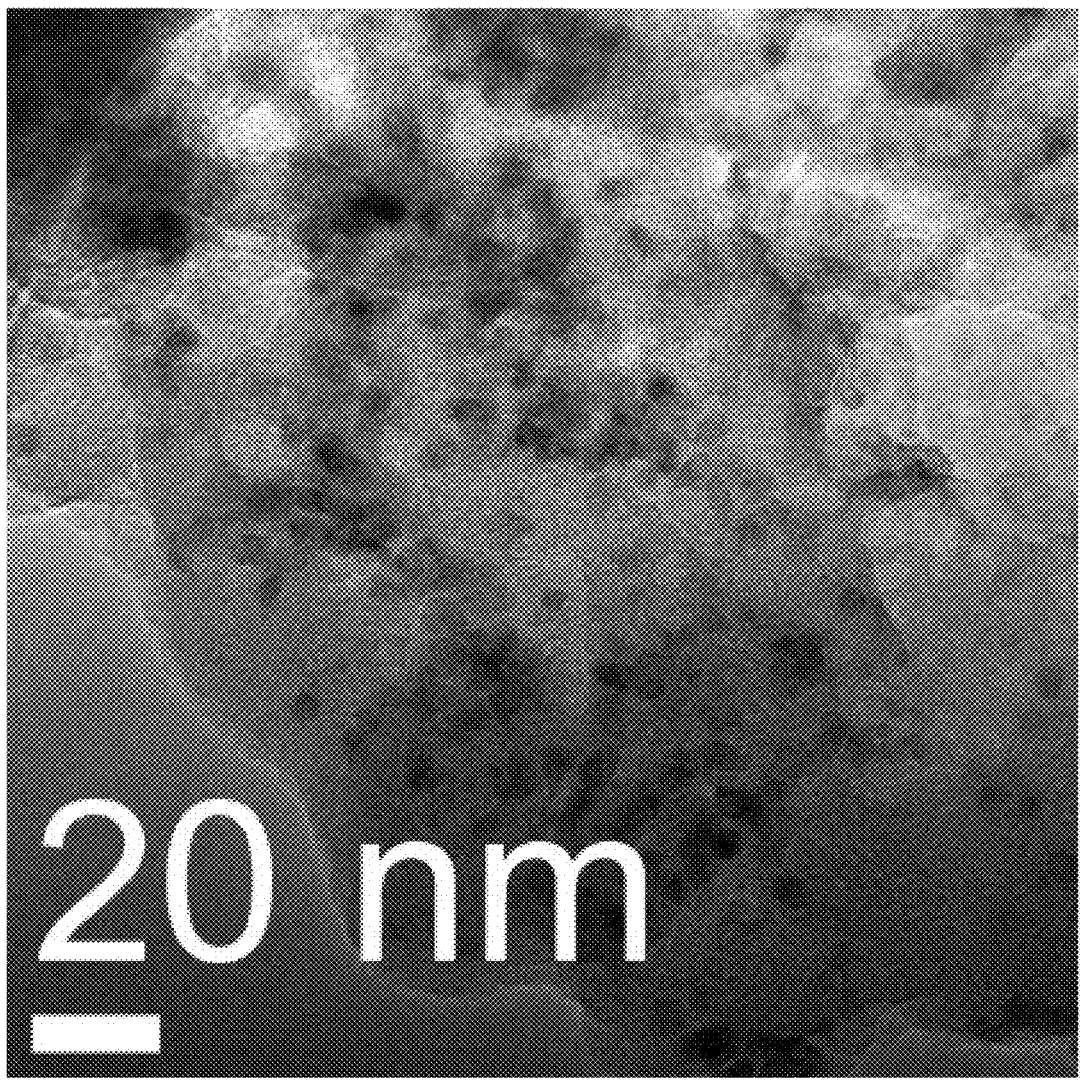

A general schematic of the apparatus used is shown in FIG. 3. A three-compartment electrochemical reactor 350 is shown in which a three-compartment container 12 encloses an anolyte compartment 18, an anode 14, and, during operation, anolyte 24 contained within the anolyte compartment 18; a membrane 22; a catholyte compartment 20, a porous cathode 16 as described herein, and, during operation, catholyte compartment mixture 26 contained within the catholyte compartment 20; and a gas compartment 28, the gas compartment 28 containing, during operation, $CO_2$ gas 30. The membrane 22 separates the anolyte compartment 18 and the catholyte compartment 20 and the porous cathode 16 separates the catholyte compartment from the gas compartment 28. Also during operation, an anolyte feed 36 introduces anolyte 24 into the anolyte compartment 18, an anolyte withdrawal 44 removes anolyte 24 as well as other anode reaction products, a catholyte feed 34 introduces catholyte 25 into the catholyte compartment 20, a catholyte compartment mixture withdrawal 42 removes catholyte compartment mixture 26, and a $CO_2$ gas feed 32 introduces $CO_2$ gas 30 into the gas compartment 28. During operation, the $CO_2$ gas 30 in the gas compartment 28, under a pressure differential across the porous cathode 16, is distributed (indicated by arrows 40 and flows through the porous cathode 16 and into the catholyte mixture 26.

To obtain IR and $V_{ANODE}$, two experiments were performed with reference electrode probes extended into the cathode and anode chambers. The potential difference between the probes on either side of a membrane (e.g., Nafion®) was measured and the potential difference between the cathode and the probe in the respective chamber was also measured. An Ag—AgCl reference electrode was inserted from the side into the cathode chamber and a Cu—CuSO$_4$ reference electrode was inserted into the anode chamber.

With reference to FIG. 3, Test Protocol 1 was performed using a Sn-electroplated CFP cathode, 2M KCl catholyte, and 0.5M H$_2$SO$_4$+0.5M K$_2$SO$_4$ anolyte. Test Protocol 2 was performed using a nano-Sn particle-based cathode (1.8 mg/cm$^2$); the catholyte and anolyte were identical to Test Protocol 1. The anode comprised a Ti substrate coated with a IrO$_2$. Two runs were made of each set of test conditions.

Figure 12:
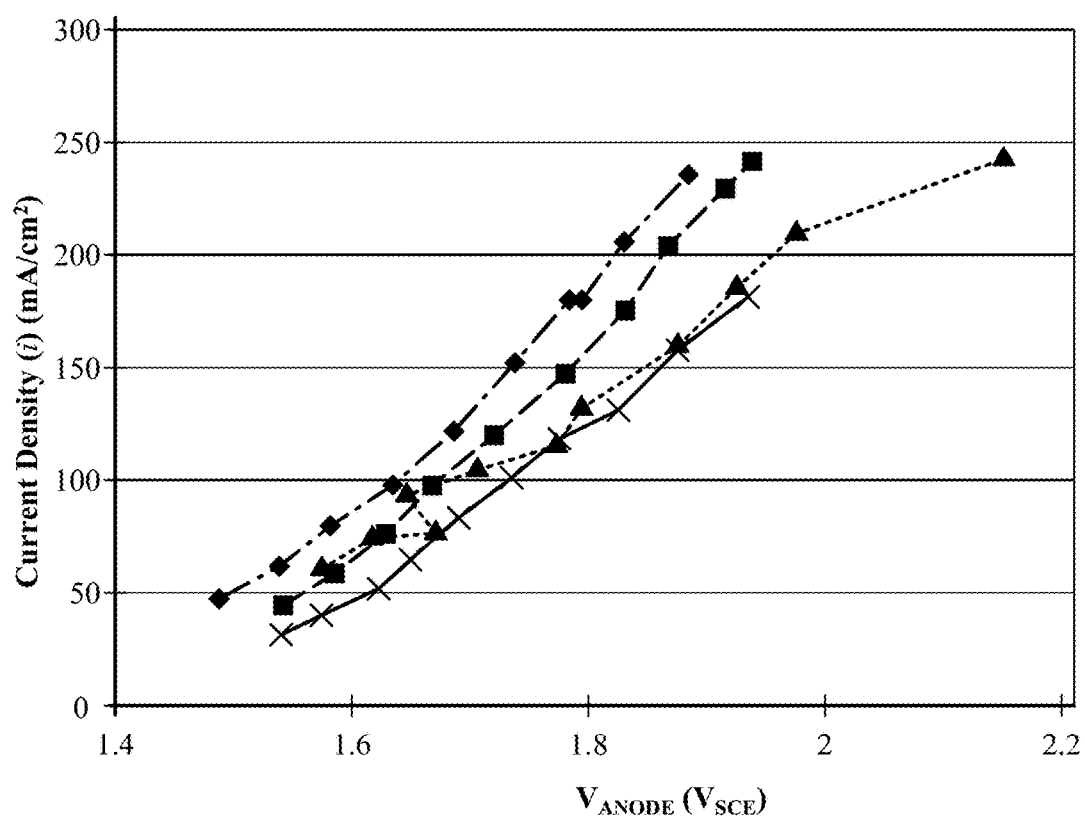
FIG. 12 is a graphical representation of Current Density i (mA/cm$^2$) v. $V_{ANODE}$ ($V_{SCE}$) for two runs each of Test Protocol 1 and Test Protocol 2, each protocol using Sn—C-3.
Figure 12:
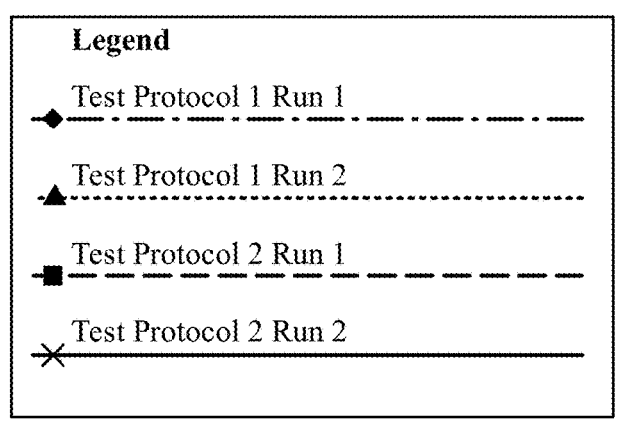
Figure 13:
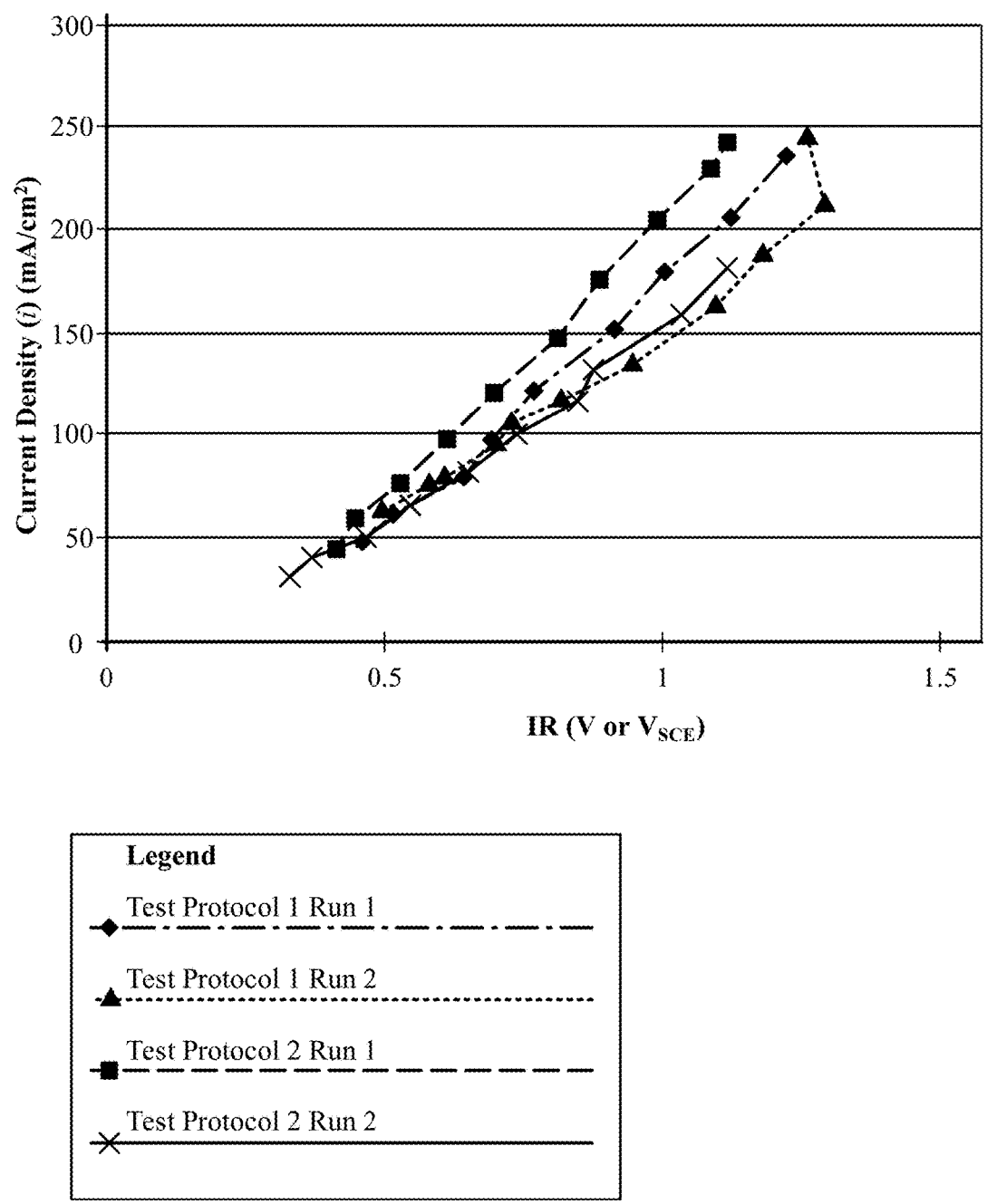
FIG. 13 is a graphical representation of Current Density (mA/cm$^2$) v. IR (V or $V_{SCE}$) for two runs each of Test Protocol 1 and Test Protocol 2.

For the two test protocols of two runs each, FIG. 12 shows Current Density i (mA/cm$^2$) v. $V_{ANODE}$ ($V_{SCE}$). FIG. 13 shows Current Density i (mA/cm$^2$) v. IR (V or $V_{SCE}$) [ohmic loss (V or $V_{SCE}$)]. After the tests, since $V_{APPLIED\text{-}TOTAL\text{-}CELL}$ was measured directly, $V_{CATHODE}$ was obtained using Eq. (1). Although shown in FIGS. 12 and 13, Test Protocol 2 results were not used in the calculations as there was a large loss in current densities. While not wishing to be bound by an particular theory, this large loss in current densities may have been caused by degradation of the particle-coated cathode, perhaps due, in part, to mechanical abrasion from the reference electrode.

Post-experiment reference probe measurements versus SCE in saturated KCl are shown in Table 7 below, which indicates very little degradation over time.

TABLE 7

| Probe Type | Before (mV) | After (mV) |
|---|---|---|
| Ag—AgCl | −42 | −28 |
| Cu—CuSO$_4$ | 72 | 50 |

Table 8 shows the results of a series of experiments performed with Sn—C-3 cathode electrodes made according to Experiment 3 above. Catalyst loading was 1.8 mg/cm² at 30 weight percent $SnO_X$ on CFP substrate. In all experiments, the catholyte was 2M KCl at 9-11 ml/min. saturated with carbon dioxide. The anolyte was $H_2SO_4+K_2SO_4$ at 55-65 ml/min. The carbon dioxide flowrate was about 100 ml/min. The anode comprised a mixed metal oxide anodic catalyst ($IrO_2$) on a Ti substrate.

TABLE 8

| Parameter | Units | Sn-C-3 Experiment | | |
|---|---|---|---|---|
| | | S1 | S2 | S3 |
| Run Time | hours | 120 | 200 | 288 |
| $V_{CATHODE}$ Range | (min-max) $V_{SCE}$ | -1.77 to -1.89 | -1.63 to -1.72 | -1.66 |
| $V_{CATHODE}$ (expected) | $V_{SCE}$ | 1.85 | 1.7 | 1.66 |
| $i_{TOTAL}$ (t = 0) | mA/cm² | 200 | 140 | 127 |
| $i_{TOTAL}$ (t = max) | mA/cm² | 170 | 101 | 114 |
| Decrease in Current (%) | {[($i_{TOTAL}$ (t = 0) − $i_{TOTAL}$ (t = max)]/$i_{TOTAL}$ (t = 0)} * 100 | 15 | 40 | 10 |
| FE (%) (t = 0) | | 80-87 | 67-77 | 70 |
| FE (%) (t = max) | | 68 | 63 | 70 |
| Catalyst Loading | mg/cm² | 1.8 | 1.8 | 1.8 |
| Binder Content | weight percent of catalyst loading | 0.1 | 0.5 | 1 |

Sn—C-3 Electrode Experiment S1

Figure 14:
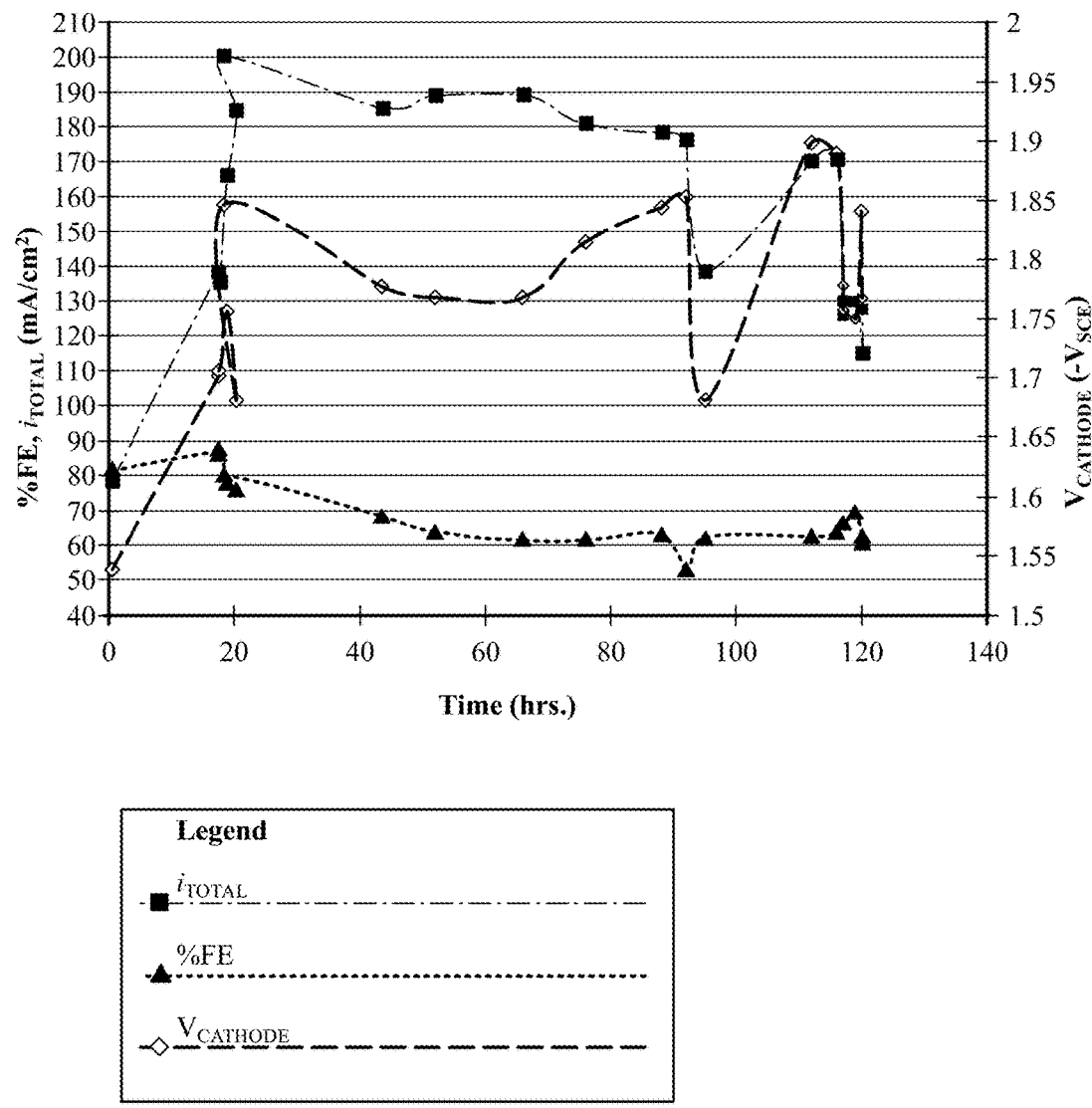
FIG. 14 is a graphical representation of $I_{TOTAL}$ (mA/cm$^2$), FE (%), and $V_{CATHODE}$ v. Time (t) (hrs.) for Electrode Experiment S1.
Figure 15:
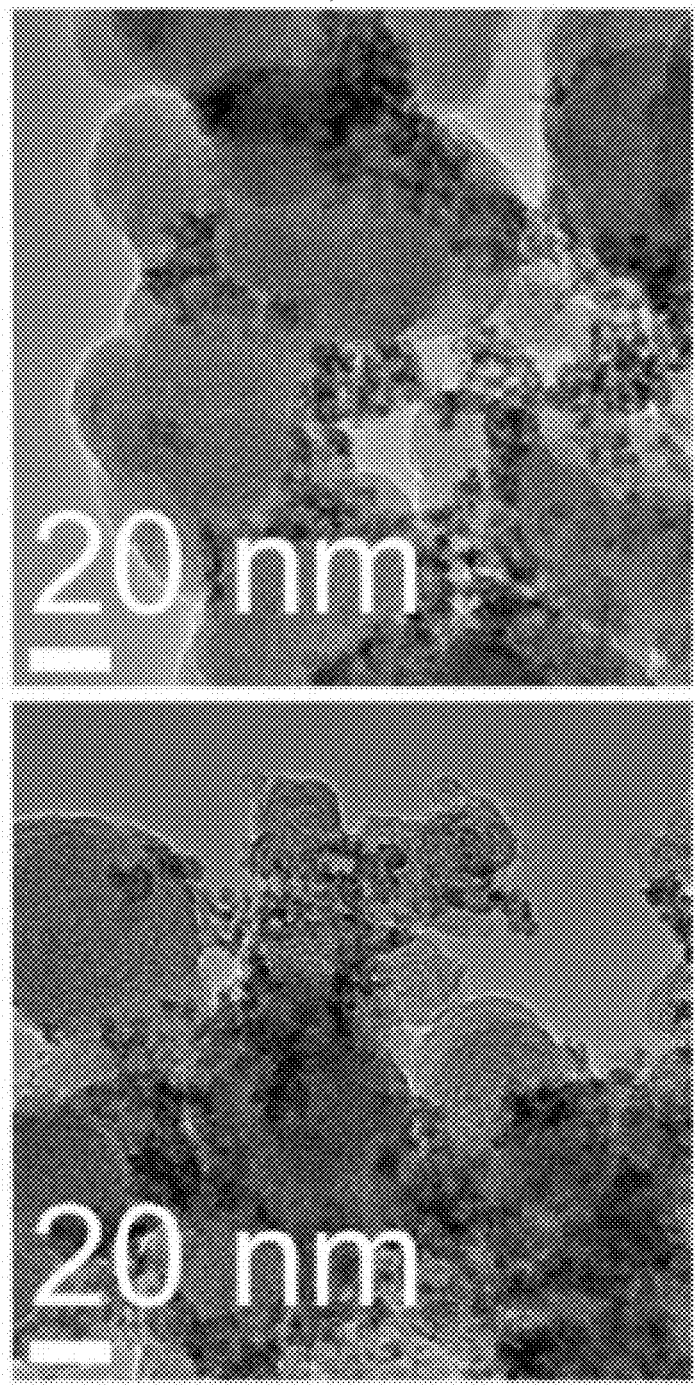
FIGS. 15-18 are TEM images of unused and used Sn—C-3 particles from Electrode Experiment S1.
Figure 16:
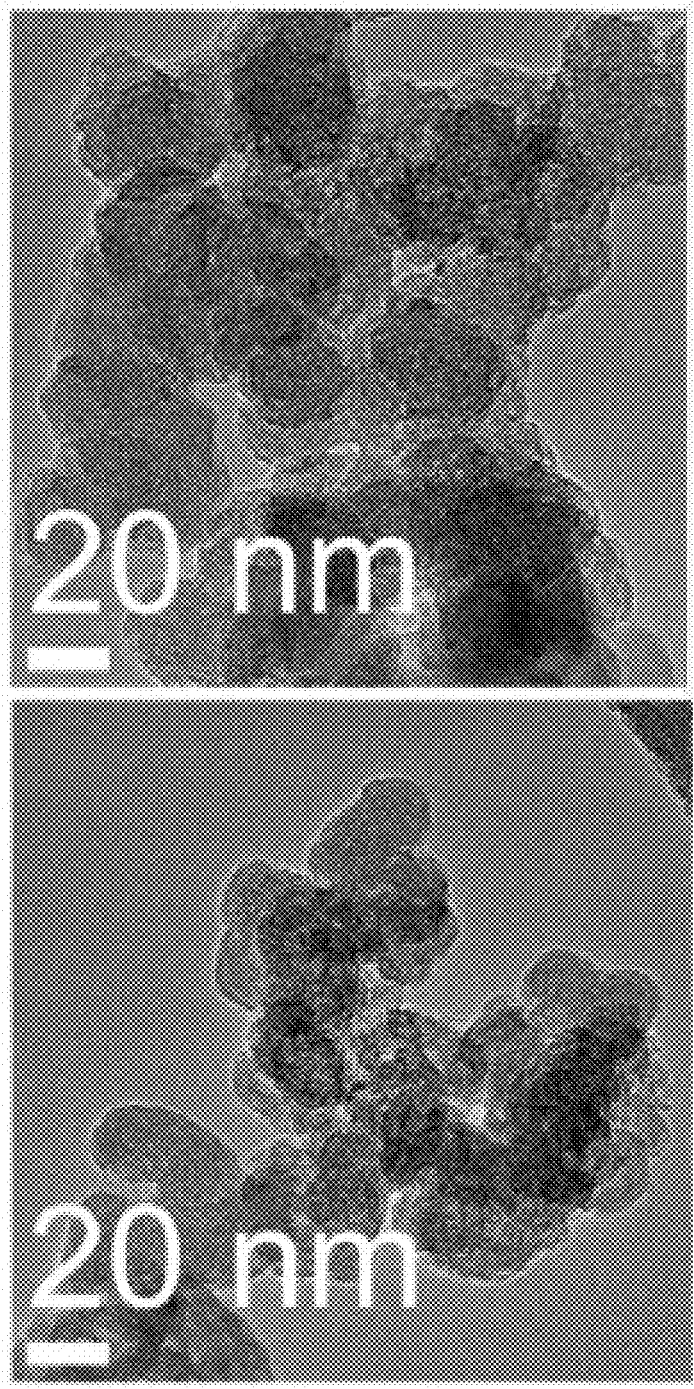
Figure 17:
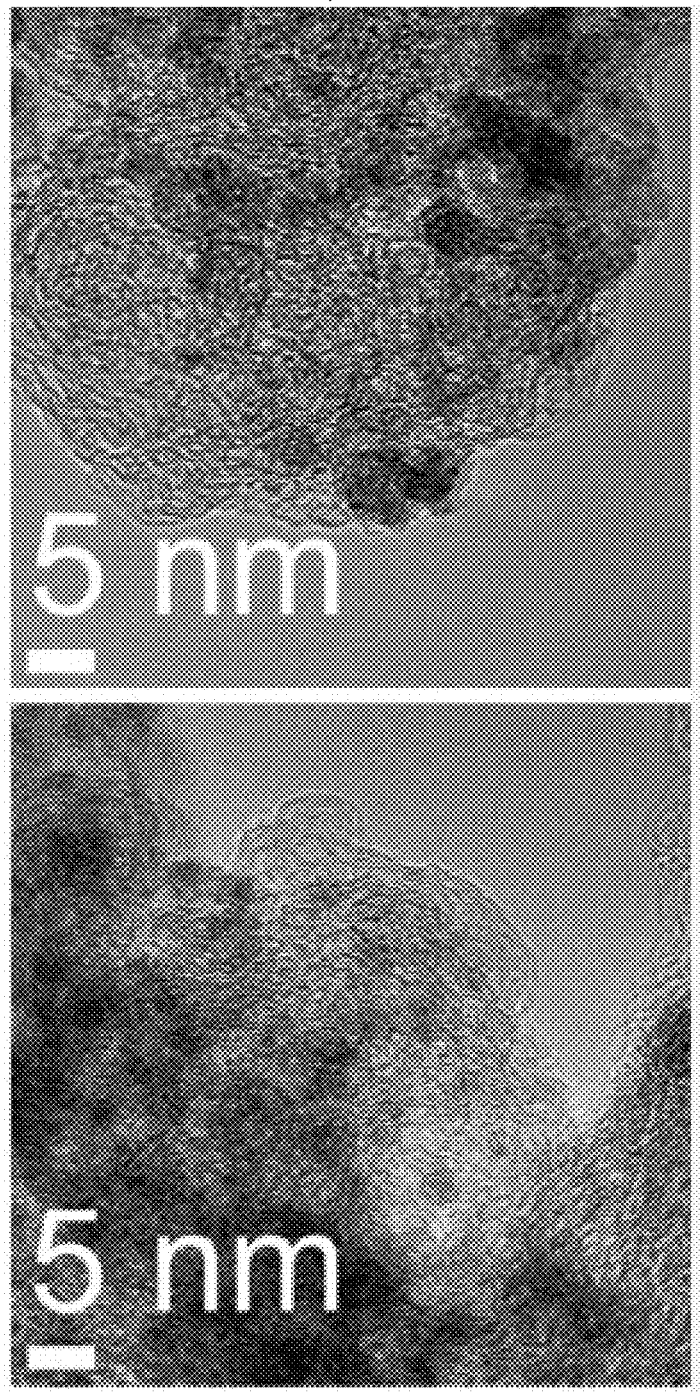
Figure 18:
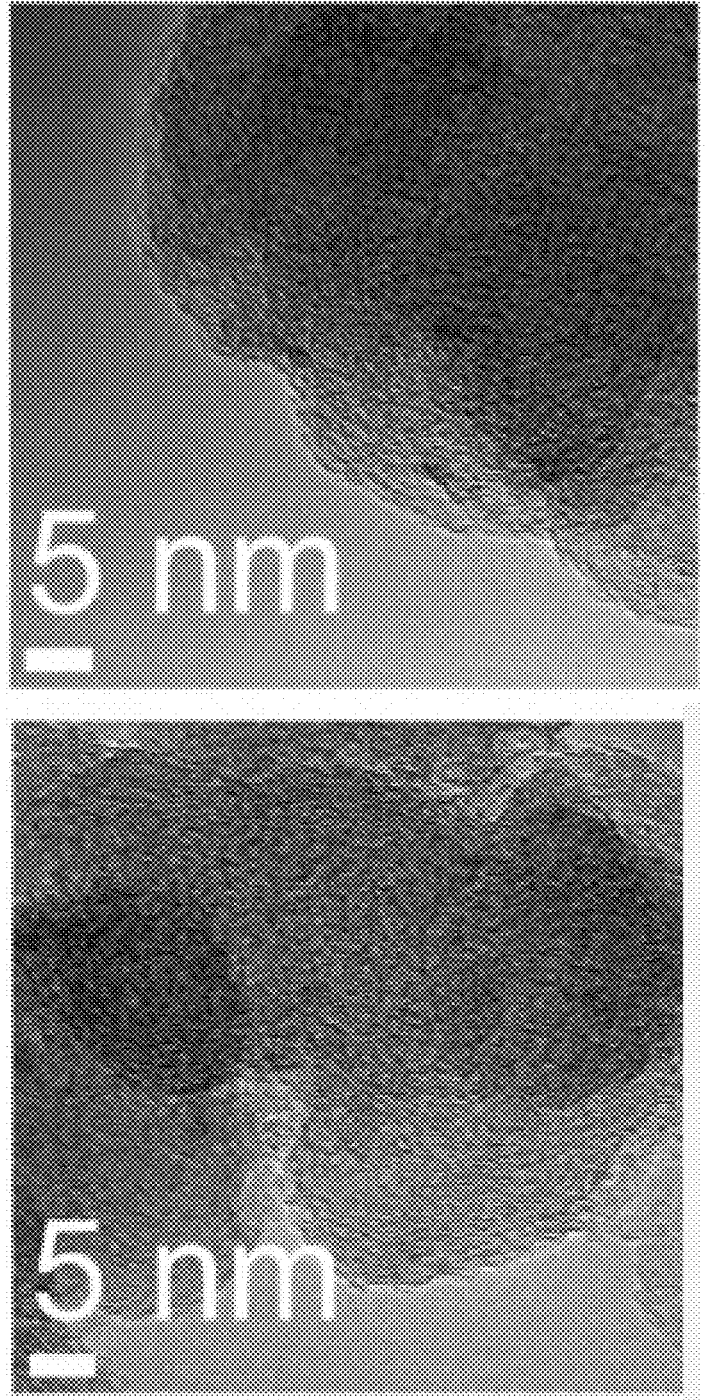

As shown in Table 7, $V_{CATHODE}$ is in the range of −1.77 to −1.89 $V_{SCE}$ with the majority of the experiment at $V_{CATHODE}$>−1.8 $V_{SCE}$. FIG. 14 shows $i_{TOTAL}$ (mA/cm²), FE (%), and $V_{CATHODE}$ v. Time (hrs.). One could conclude, from FIG. 14 that, with time, the cathode voltage ($V_{CATHODE}$) must be increased to maintain the same current density ($i_{TOTAL}$). Notably, at about t=115 hours, $V_{CATHODE}$ is about the same as $V_{CATHODE}$ at t=20, but there is about a 15 percent loss in $i_{TOTAL}$, and an 18.5 percent loss in FE. A more abrupt loss in current density ($i_{TOTAL}$) occurs at about t=120 hours. A comparison of associated TEM images shown in FIGS. 15-18 shows a possible loss of Sn—C-3 particles with time from the CFP support surface. While not wishing to be bound by any particular theory, physical abrasion could cause this loss, which may be reduced by adjusting binder content. On the other hand, such loss could be due to the higher applied $V_{CATHODE}$. (Compare, Sn—C-3 Electrode Experiments S2 and S3, using lower $V_{CATHODE}$.) FIG. 14 also indicates a sharp rise in $V_{CATHODE}$ as well as $i_{TOTAL}$ from t=0 up to about t=20 hours, possible due, in part, to some preconditioning effects.

Sn—C-3 Electrode Experiment S2

Figure 8:
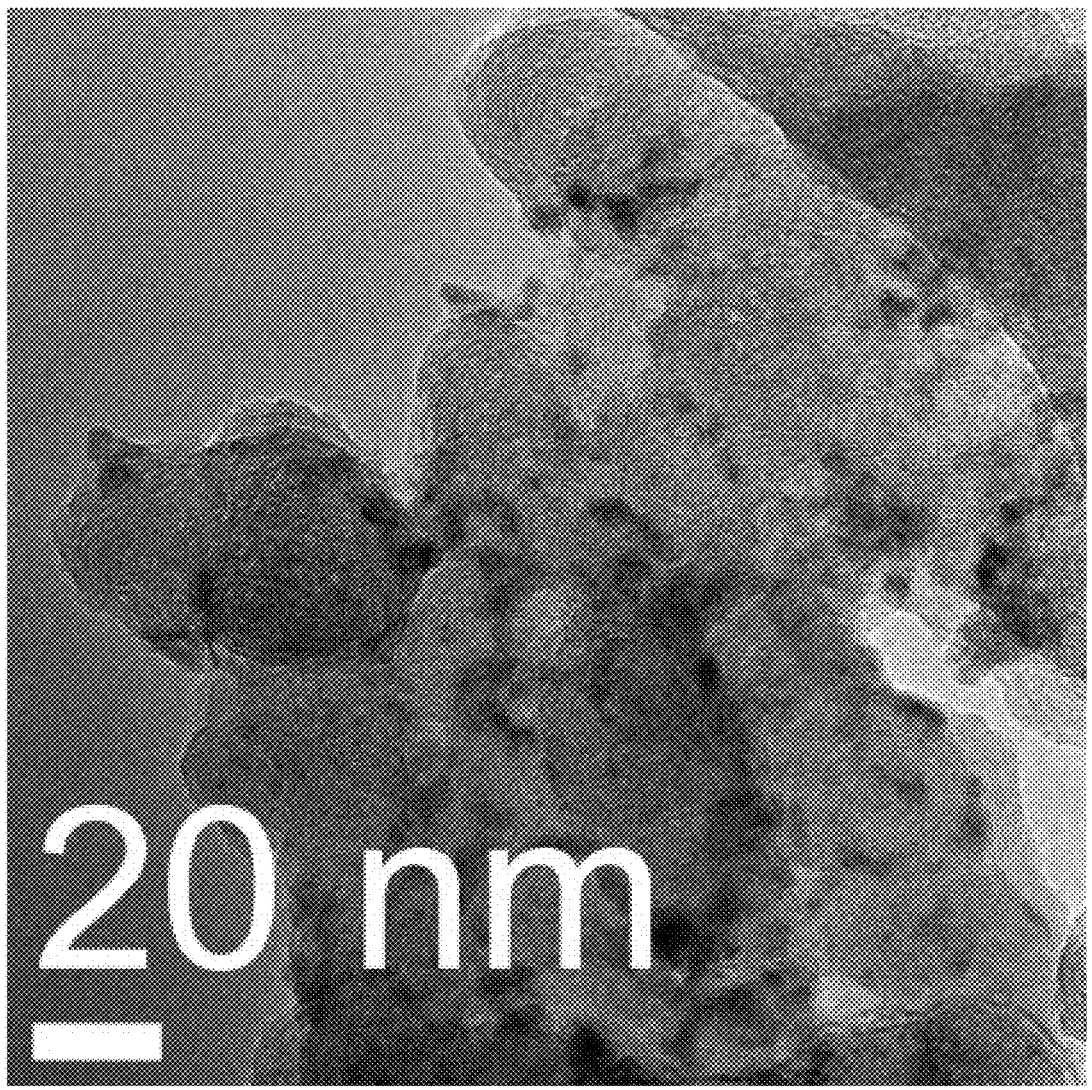
Figure 9:
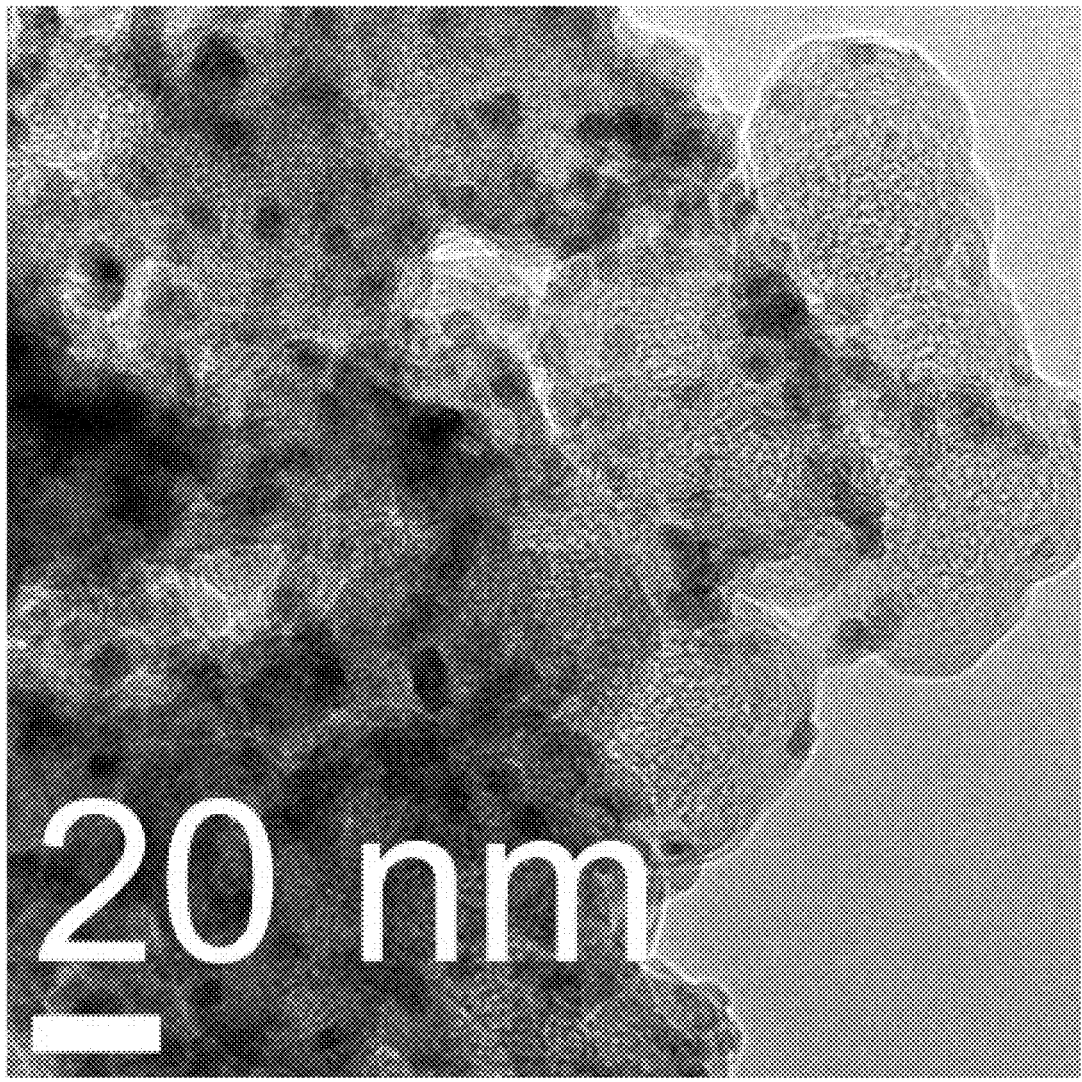
Figure 19:
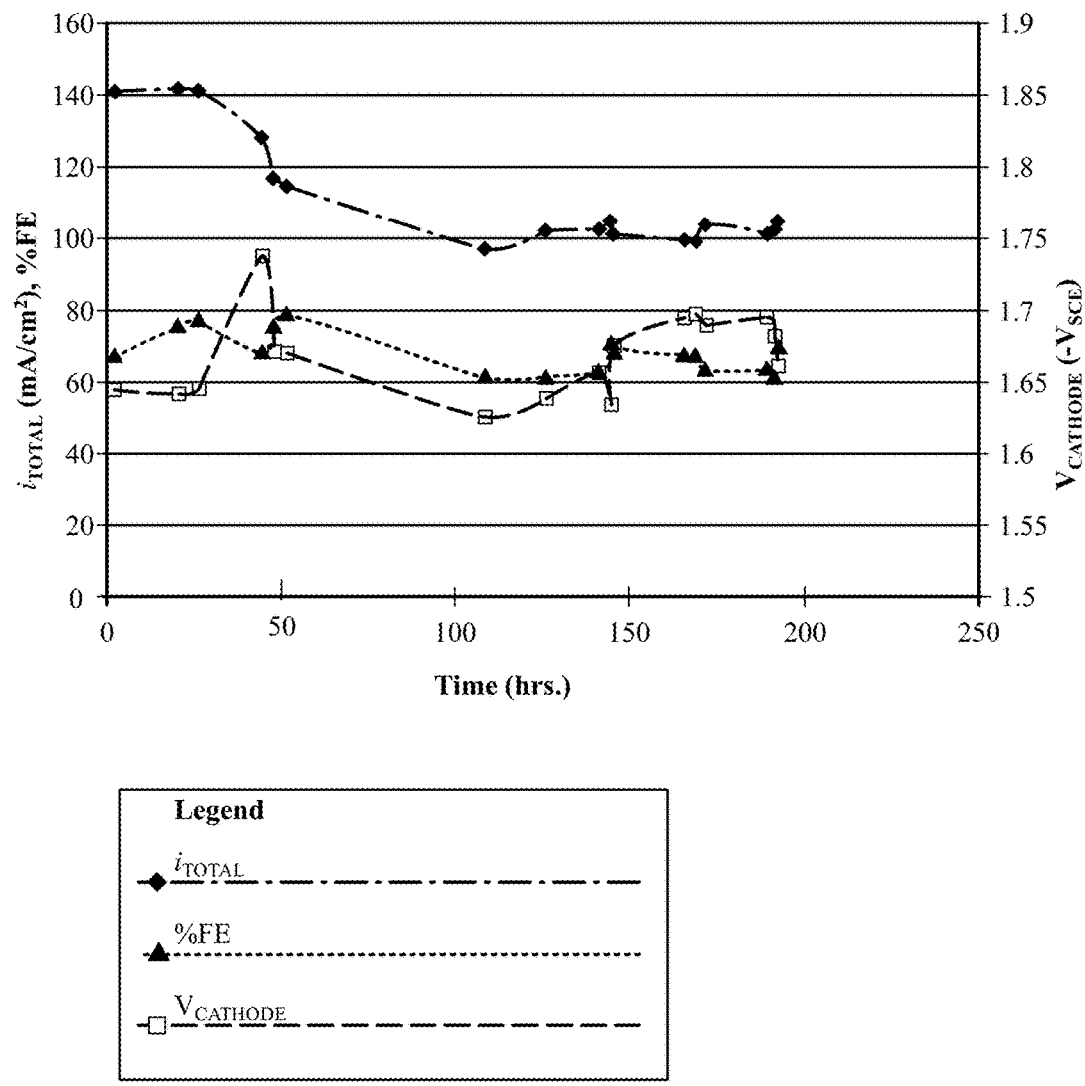
FIG. 19 is a graphical representation of $i_{TOTAL}$ (mA/cm$^2$), FE (%), and $V_{CATHODE}$ v. Time (t) (hrs.) for Electrode Experiment S2.
Figure 20:
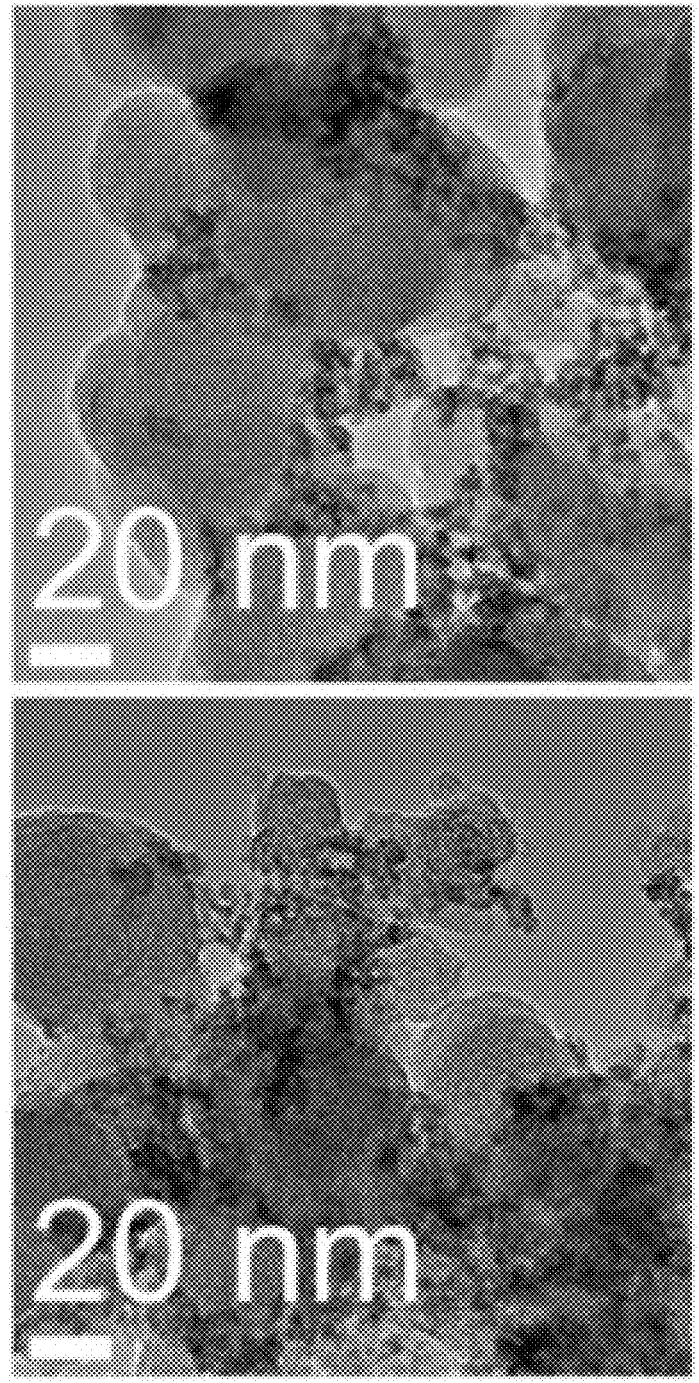
FIGS. 20-23 are TEM images of unused and used Sn—C-3 particles from Electrode Experiment S2.
Figure 21:
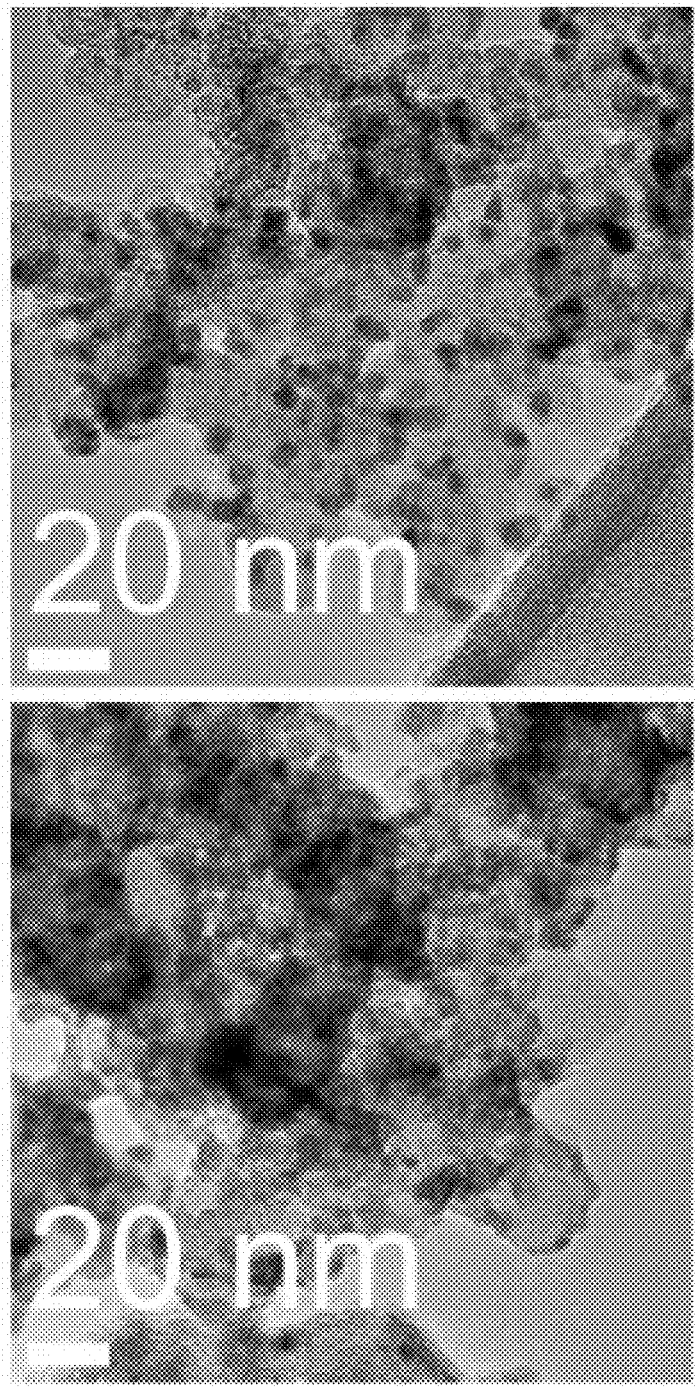
Figure 22:
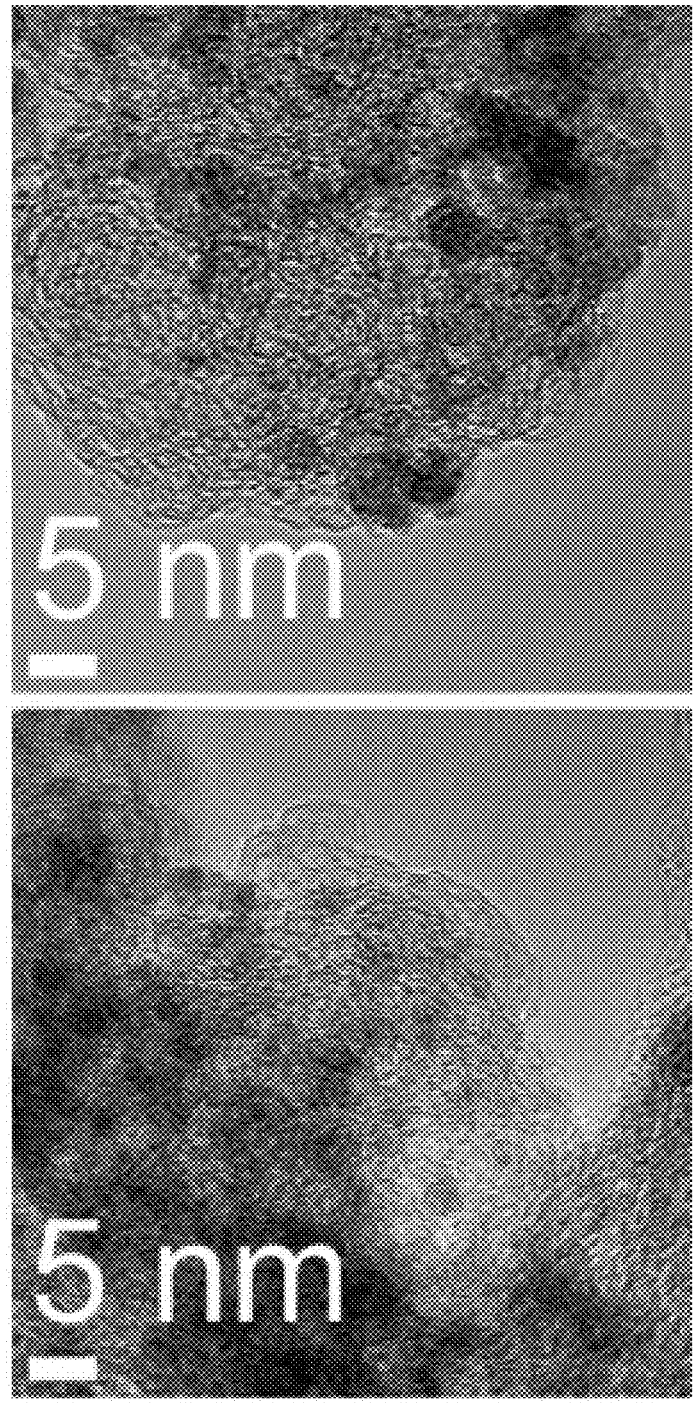
Figure 23:
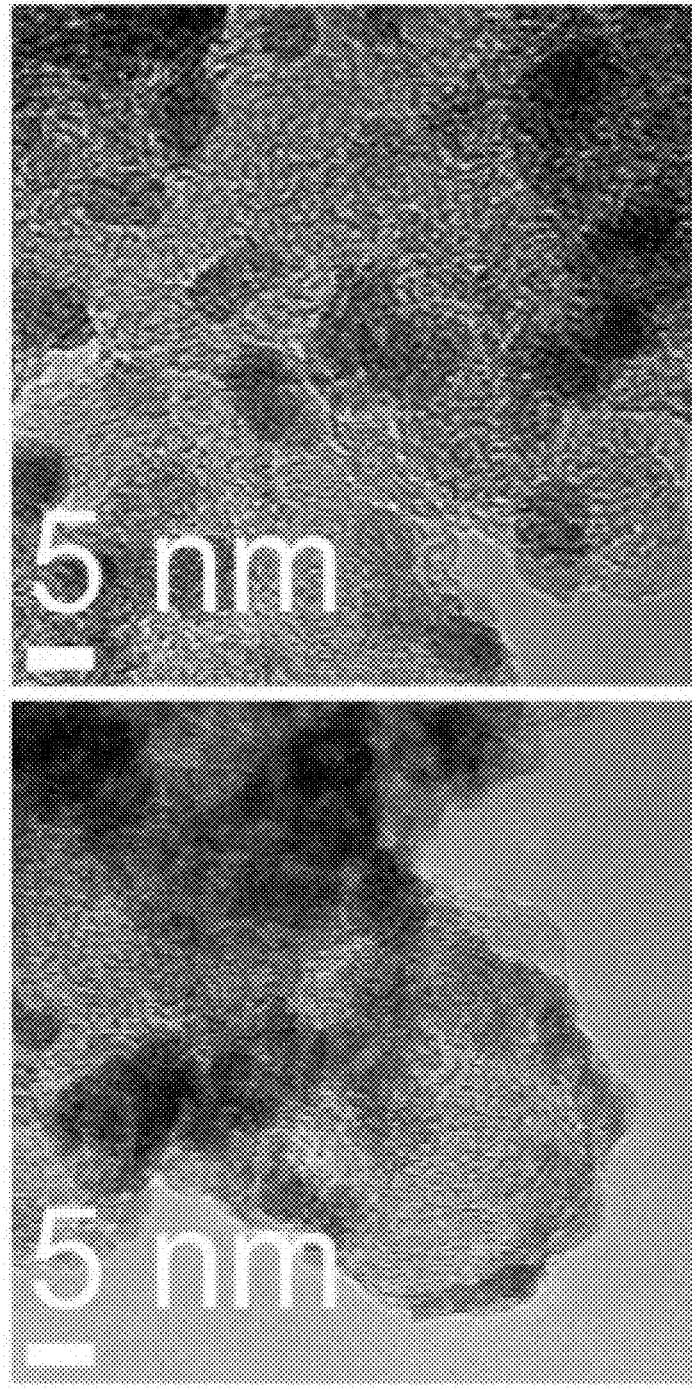
Figure 24:
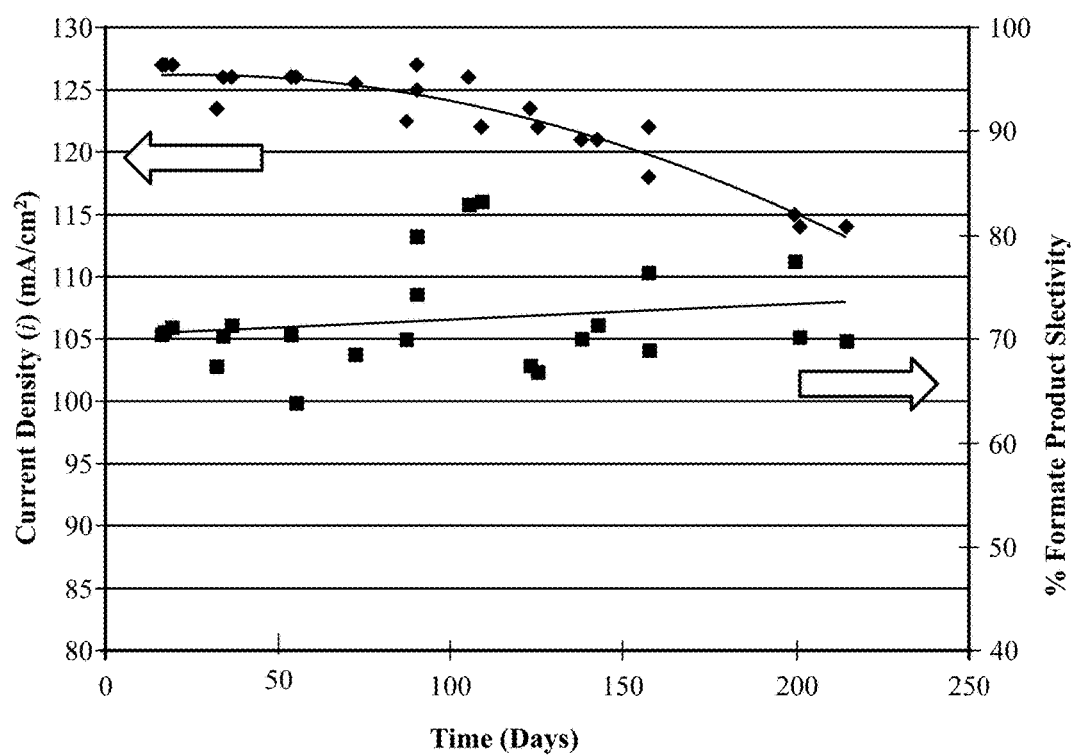
FIG. 24 is a graphical representation of Current Density (mA/cm$^2$) and Formate Product Selectivity (%) v. Time (t) (days) for Electrode Experiment S3.
Figure 25:
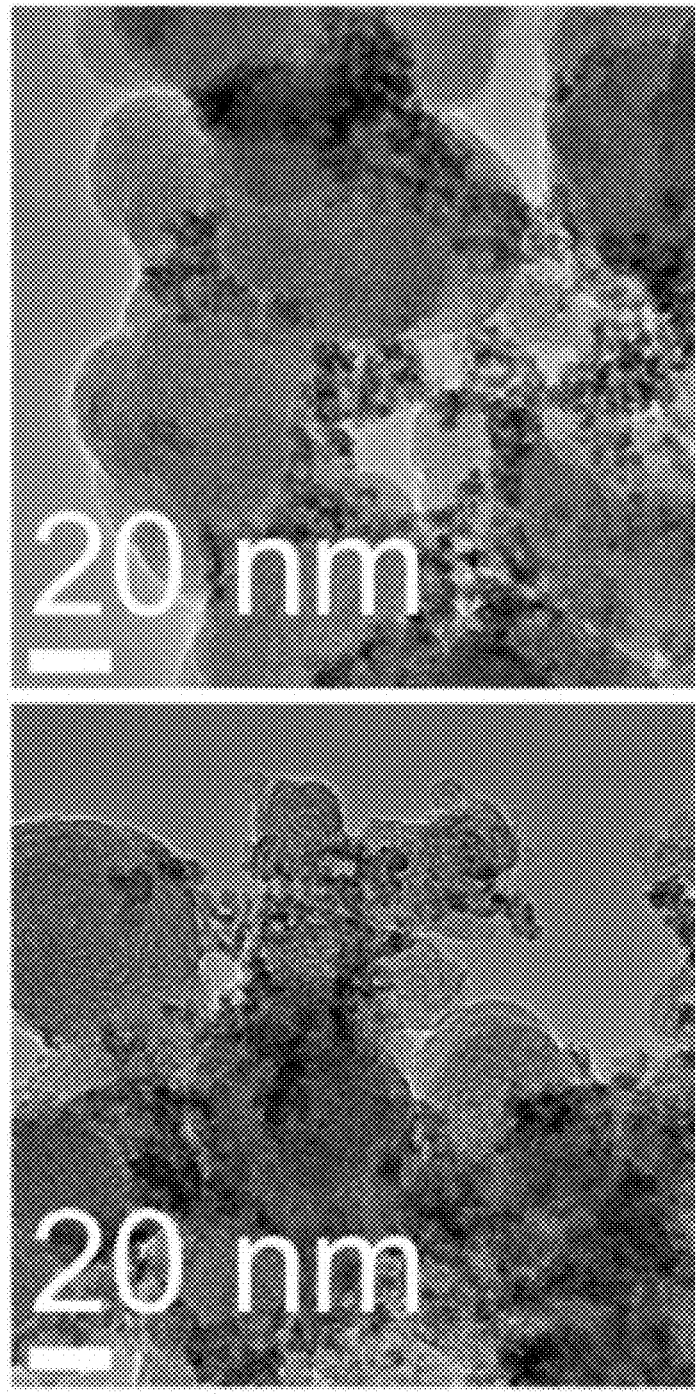
FIGS. 25-28 are TEM images of unused and used Sn—C-3 particles from Electrode Experiment S3.
Figure 26:
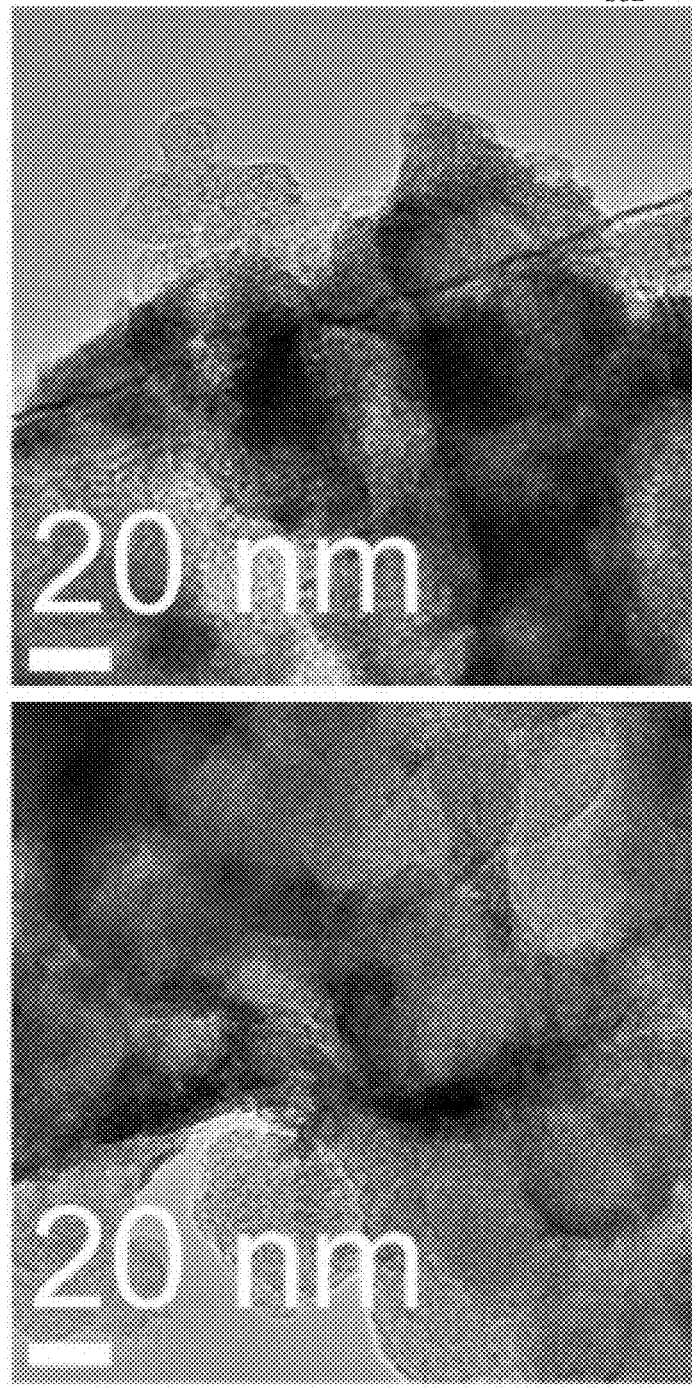
Figure 27:
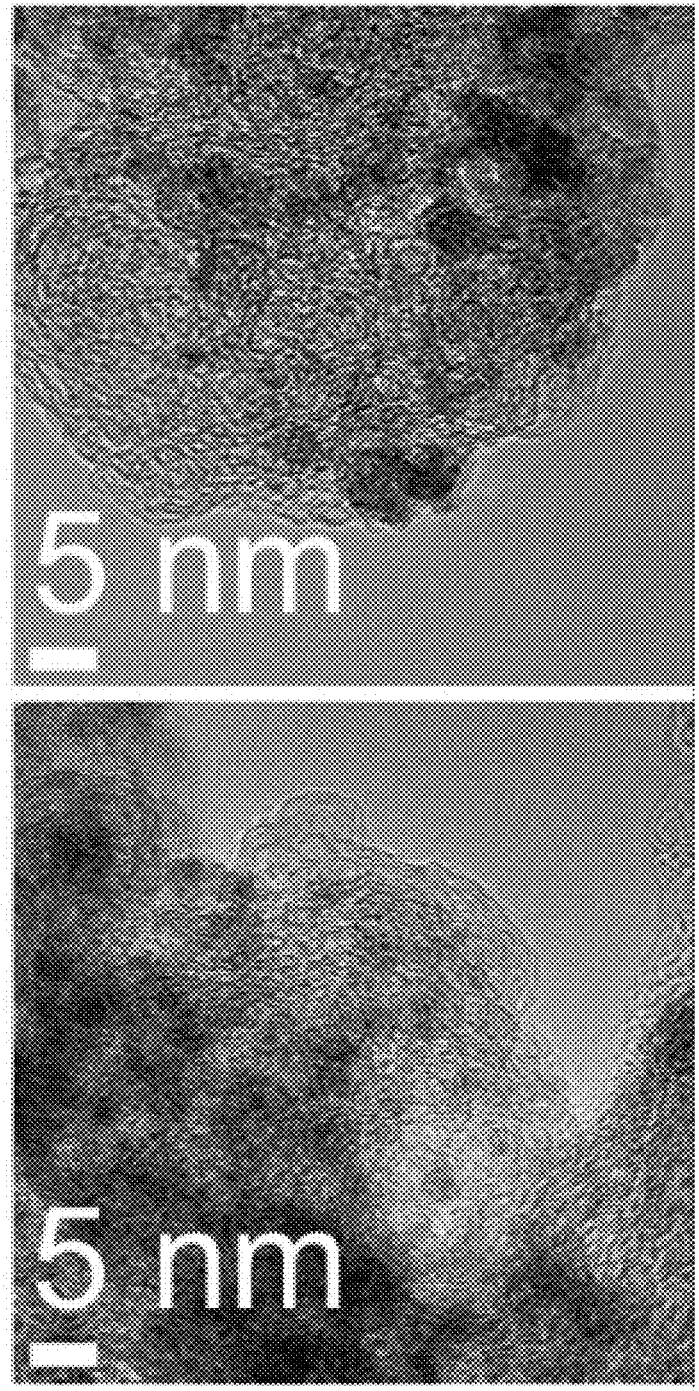
Figure 28:
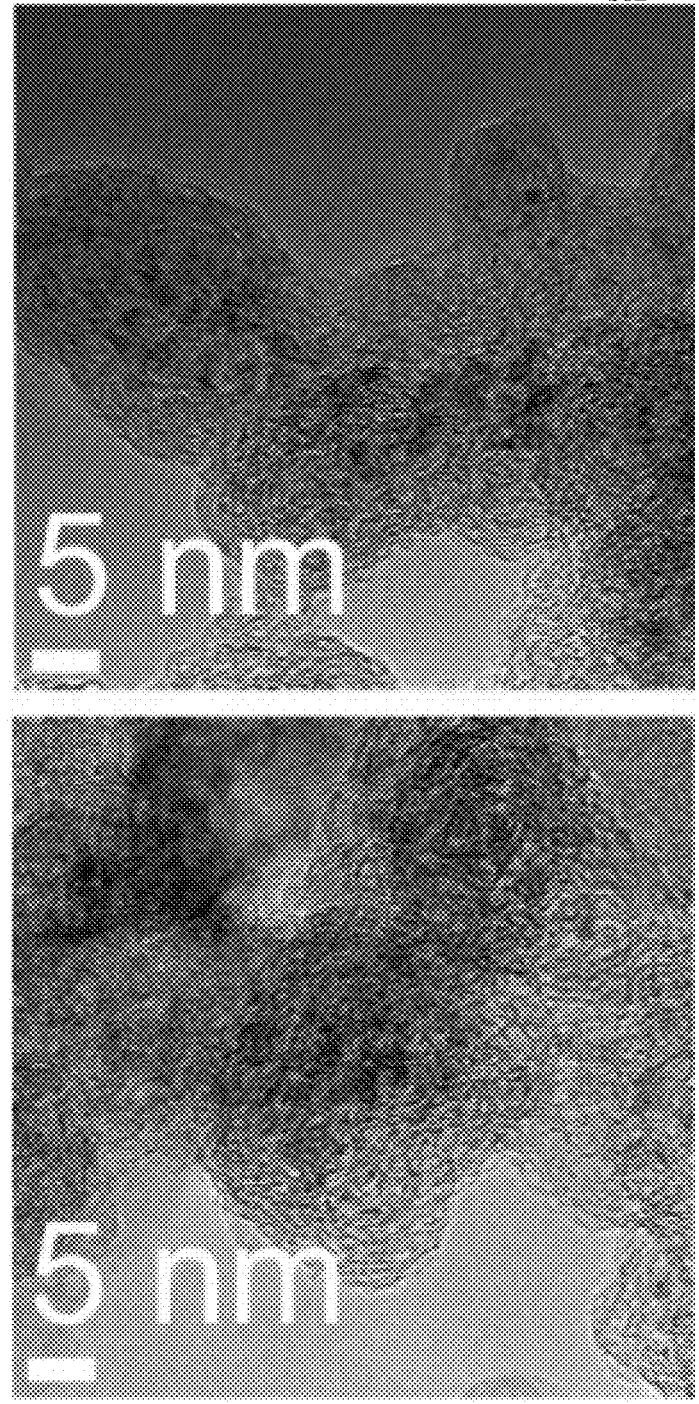

Turning now to FIG. 19, $V_{CATHODE}$ is in the range of −1.65 to −1.72 $V_{SCE}$ with the majority of the experiment at $V_{CATHODE}$≤−1.70 $V_{SCE}$. As seen in FIG. 8, a large drop in total current density, $i_{TOTAL}$, of about 25-40 percent is observed between t=25 hours and t=100 hours and then remains constant from about t=100 hours to about t=200 hours. While not wishing to be bound by any particular theory, the fluctuations in $V_{CATHODE}$ and FE in the last 100 hours may have been caused by poor adhesion of the particles to the CFP substrate.

Turning now to related FIGS. 20-23, the TEM images show no loss in Sn—C particle density for used versus unused. Thus, applying $V_{CATHODE}$ of about −1.7 $V_{SCE}$ for about 200 hours did not appear to lead to a loss of Sn—C particles from the CFP support. While not wishing to be bound by any particular theory, the overall loss of total current density, $i_{TOTAL}$ may be attributable to the loss of Sn—C particles due to lack of adhering which may be corrected with improved binder content. (Compare, Electrode Experiment S3.)

Sn—C-3 Electrode Experiment S3

In Sn—C-3 Electrode Experiment S3, the binder content was increased to 1 percent in an effort to reduce Sn—C particle loss from the CFP substrate. (Compare, Sn—C-3 Electrode Experiment S2.) In addition, cathode potential, $V_{CATHODE}$ is held at −1.66 $V_{SCE}$ to avoid Sn—C particle loss. (Compare Sn—C-3 Electrode Experiment 51, FIGS. 14 and 15-18.) The results of Sn—C-3 Electrode Experiment S3 are shown in FIGS. 24 and 25-28. Loss in total current, $i_{TOTAL}$ over 240 hours was 10 percent and FE remained fairly constant at about 70 percent. Looking at FIGS. 25-28, there seems to be no apparent loss in total Sn—C-3 particles. (Compare, Sn—C-3 Electrode Experiment 51, FIGS. 14 and 15-18 at higher $V_{CATHODE}$.) Still looking at FIGS. 25-28, there does appear to be some agglomeration and possible breaking up of Sn—C-3 particles. Total Sn—C-3 loss seems negligible, however, thus allowing for the use of such electrodes for longer times at lower applied $V_{CATHODE}$.

While certain embodiments of the present invention have been disclosed in detail, it is to be understood that various modifications may be adopted without departing from the spirit of the invention or scope of the following claims.

We claim:

1. A process for preparing a catalyst ink, comprising mixing, proportionally:
    (i) catalyst powder, the catalyst powder configured to catalyze the electrochemical reduction of carbon dioxide;
    (ii) an aliphatic alcohol in a ratio of about 0.02 gm catalyst powder per 100 ml alcohol; and
    (iii) a binder, which binder is proportional to the alcohol in a ratio of about 0.02 mg to about 1 mg per 100 ml alcohol.

2. The process of claim 1, wherein the binder content is between about 0.03 to about 5 weight percent of the catalyst loading.

3. The catalyst ink of claim 1, wherein the binder comprises sulfonated tetrafluoroethylene-based fluoropolymer copolymer.

4. The process of claim 1, wherein the aliphatic alcohol is isopropyl alcohol.

5. The process of claim 1, wherein the catalyst powder is prepared by steps comprising:
    (a) mixing, proportionally, tin chloride (II) and carbon support in a ratio of about 4.5 gm/gm and sufficient ethylene glycol and water to maintain a dilute slurry;
    (b) refluxing the slurry of Step (a) at between 170 deg. C. and 200 deg. C. for about three hours;
    (c) cooling the refluxed material;
    (d) filtering and drying the cooled, refluxed material to obtain the catalyst powder.

6. The process of claim 1, wherein the catalyst powder comprises tin-carbon particles, the tin-carbon particles comprising 0.1 nm to 10 nm tin deposits on carbon support.

7. The process of claim 6, wherein the tin deposits comprise greater than 22 weight percent of the catalyst powder.

8. A process for preparing a catalyst ink, comprising mixing catalyst powder, an aliphatic alcohol, and binder such that, when the catalyst powder and alcohol are in a ratio of about 0.02 gm catalyst powder per 100 ml alcohol, then the binder is present in a ratio of about 0.02 mg per 100 ml alcohol.

9. A process, comprising:
(a) providing a catalyst ink, the catalyst ink prepared by the process of claim 1;
(b) spraying a portion of catalyst ink onto a porous substrate; and
(c) allowing the catalyst ink sprayed onto the porous substrate to dry.

10. The process of claim 9, wherein the substrate is carbon fiber paper, the catalyst loading is between 0.1 mg/cm$^2$ and 10 mg/cm$^2$, and the binder content is between 0.1 to 5 weight percent of the catalyst loading.

11. The process of claim 9, wherein the porous substrate comprises carbon fiber paper.

12. The process of claim 9, further comprising the step of repeating Step (b) and Step (c) until a desired coating weight is achieved.

13. The process of claim 12, wherein the catalyst loading is between 0.1 mg/cm$^2$ and 10 mg/cm$^2$.

14. A cathode prepared by the process of claim 9.

15. An apparatus, comprising:
an anolyte compartment, the anolyte compartment at least partially defined by an anode and a membrane;
a catholyte compartment, the catholyte compartment at least partially defined by the membrane and a cathode, the cathode prepared by the process of claim 9 and
a gas compartment, the gas compartment in fluid communication with the cathode.

16. A process, comprising:
(a) providing the apparatus of claim 15;
(b) feeding an appropriate anolyte into the anolyte compartment;
(c) feeding an appropriate catholyte into the catholyte compartment;
(d) feeding carbon dioxide into the gas compartment, through the cathode, and into the cathode compartment; and
(e) impressing a voltage between the anode and the cathode.

17. The process of claim 16, wherein the impressed voltage is sufficient to provide a $V_{CATHODE}$ range between $-1.5$ and $-2.0$ $V_{SCE}$.

18. The process of claim 16, wherein the Faradic Efficiency of carbon dioxide to formate is about 55 to 95 over a period of over 100 hours.

19. The process of claim 16, wherein the current density is greater than 100 mA/cm$^2$.

* * * * *